(12) United States Patent
Zhang et al.

(10) Patent No.: US 9,538,180 B2
(45) Date of Patent: Jan. 3, 2017

(54) MOTION VECTOR PREDICTION IN VIDEO CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 14/107,144

(22) Filed: Dec. 16, 2013

(65) Prior Publication Data

US 2014/0169475 A1    Jun. 19, 2014

Related U.S. Application Data

(60) Provisional application No. 61/738,271, filed on Dec. 17, 2012.

(51) Int. Cl.
*H04N 7/12* (2006.01)
*H04N 7/50* (2006.01)
*H04N 19/51* (2014.01)
*H04N 19/597* (2014.01)
*H04N 19/513* (2014.01)
*H04N 19/573* (2014.01)
*H04N 19/593* (2014.01)

(52) U.S. Cl.
CPC ...... *H04N 19/00684* (2013.01); *H04N 19/513* (2014.11); *H04N 19/573* (2014.11); *H04N 19/593* (2014.11); *H04N 19/597* (2014.11)

(58) Field of Classification Search
CPC .. H04N 19/597; H04N 19/513; H04N 19/593; H04N 19/00684; H04N 19/573

USPC ............ 375/240.12, 240.16, 240.24–240.26
See application file for complete search history.

(56) References Cited

U.S. PATENT DOCUMENTS 6,400,996 B1    6/2002   Hoffberg et al.
6,667,698 B2   12/2003   Apostolopoulos et al.
(Continued)

FOREIGN PATENT DOCUMENTS

WO        2012095467 A1    7/2012

OTHER PUBLICATIONS

Gerhard Tech et al. ("3D-HEVC Test Model 2", ITU-T SG 16 WP 3 and ISO/IEC JTC 1/SC 29/WG 11, Oct. 2012, Shanghai, China).*
(Continued)

*Primary Examiner* — Tat Chio
*Assistant Examiner* — On S Mung
(74) *Attorney, Agent, or Firm* — Shumaker & Sieffert, P.A.

(57) ABSTRACT

During a process to derive an inter-view predicted motion vector candidate (IPMVC) for an Advanced Motion Vector Prediction (AMVP) candidate list, a video coder determines, based on a disparity vector of a current prediction unit (PU), a reference PU for the current PU. Furthermore, when a first reference picture of the reference PU has the same picture order count (POC) value as a target reference picture of the current PU, the video coder determines an IPMVC based on a first motion vector of the reference PU. Otherwise, when a second reference picture of the reference PU has the same POC value as the target reference picture of the current PU, the video coder determines the IPMVC based on a second motion vector of the reference PU.

38 Claims, 15 Drawing Sheets

(56) References Cited

U.S. PATENT DOCUMENTS

| | | | |
|---|---|---|---|
| 8,139,641 B2 | 3/2012 | Demos | |
| 2008/0159638 A1* | 7/2008 | Song | H04N 19/61 382/233 |
| 2010/0091845 A1* | 4/2010 | Jeon | H04N 19/597 375/240.12 |
| 2012/0230392 A1 | 9/2012 | Zheng et al. | |
| 2012/0230397 A1 | 9/2012 | Ouedraogo et al. | |
| 2012/0314027 A1 | 12/2012 | Tian et al. | |
| 2013/0003851 A1* | 1/2013 | Yu | H04N 19/105 375/240.16 |
| 2013/0070855 A1 | 3/2013 | Zheng et al. | |

OTHER PUBLICATIONS

An et al., "3D-CE5.h related: Inter-view motion prediction for HEVC-based 3D video coding," JCT-3V Meeting; 101. MPEG Meeting; Jul. 16, 2012-Jul. 20, 2012; Stockholm, SE; (The Joint Collaborative Team on 3D Video Coding Extension Development of ITU-T SG.16 WP3 and ISO/IEC JTC1/SC29/WG11); URL: HTTP://PHENIX.INT-EVRY.FR/JCT2/, No. JCT3V-A0049, 6 pp.

"Test Model under Consideration for HEVC based 3D video coding," MPEG Meeting; San Jose, CA; (Motion Picture Expert Group or ISO/IEC JTC1/SC29NVG11), No. N12559, Feb. 11, 2012, 45 pp.

Bross et al., "High efficiency Video Coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency Video Coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chang et al., "Description of Core Experiment 5 (CE5): Motion/mode Parameter Prediction," Joint Collaborative Team on 3D Video Coding Extension Development of ITU-T SG 16 WP 3 and ISO/IEC JTC 1/SC 291WG 11, Jul. 16-20, 2012, 5 pp.

International Search Report and Written Opinion from International Application No. PCT/US2013/075678, dated Apr. 17, 2014, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Schwarz et al., "Description of 3D Video Technology Proposal by Fraunhofer HHI (HEVC compatible, configuration B)", MPEG Meeting; Nov. 28, 2011-Feb. 12, 2011; Geneva, CH; (Motion Picture Expert Group or ISO/IEC JTC1/SC29/WG11), No. M22571, 46 pp.

Schwarz et al., "Inter-View Prediction of Motion Data in Multiview Video Coding," 2012 Picture Coding Symposium, IEEE, May 7-9, 2012, pp. 101-104, 4 pp.

Wiegand et al., "WD1: Working Draft 1 of High-Efficiency Video Coding," JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Zhang et al., "3D-CE5.h: Merge candidates derivation from disparity vector," Joint Collaborative Team on 3D Video Coding Extension Development of ITU-T SG 16 WP 3 and ISO/IEC JTC 11SC 291WG 11, Document: JCT3V-B0048, Qualcomm Incorporated, 2nd Meeting: Shanghai, CN, Oct. 13-19, 2012, XP030130229, 4 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/075678, dated Oct. 20, 2014, 4 pp.

Bross et al., "High efficiency Video Coding (HEVC) text specification draft 9," 11th Meeting: Shanghai, CN, Oct. 10-19, 2012, JCTVC-K1003_v10, 306 pp.

* cited by examiner

| combIdx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

FIG. 7

MOTION VECTOR PREDICTION IN VIDEO CODING

This application claims the benefit of U.S. Provisional Patent Application No. 61/738,271, filed Dec. 17, 2012, the entire content of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, 3D video bitstream may contain not only texture view components, but also depth view components. For example, each view may comprise one texture view component and one depth view component.

SUMMARY

In general, this disclosure describes motion prediction. More specifically, during a process to derive an inter-view predicted motion vector candidate (IPMVC) for an Advanced Motion Vector Prediction (AMVP) candidate list, a video coder may determine, based at least in part on a disparity vector of a current prediction unit (PU), a reference PU for the current PU. Furthermore, when a first target reference picture in RefPicListX of the reference PU is in the same access unit as a target reference picture in RefPicListX of the current PU, the video coder may determine an inter-view prediction motion vector candidate (IPMVC) based on a first motion vector of the reference PU. Otherwise, when a target reference picture in RefPicListY (wherein Y is equal to 1−X) of the reference PU is not in the same access unit as the target reference picture in RefPicListX of the current PU, the video coder may determine the IPMVC based on a second motion vector of the reference PU. The video coder may use the IPMVC to determine a predictive block of the current PU.

In one example, this disclosure describes a method of decoding video data, the method comprising: determining, based at least in part on a disparity vector of a current PU of a current picture, a reference PU for the current PU, wherein the reference PU is in a reference picture that is in the same access unit as the current picture and is in a different view than the current picture, wherein a first reference index for the reference PU indicates a position, within a first reference picture list of the reference PU, of a first target reference picture for the reference PU, and wherein the first reference picture list for the reference PU has a reference picture list index equal to 1; when the first target reference picture for the reference PU is available and a Picture Order Count (POC) value of the first target reference picture for the reference PU matches a POC value of a target reference picture for the current PU, determining an inter-view prediction motion vector candidate (IPMVC) based on a first motion vector of the reference PU, wherein the first motion vector of the reference PU indicates a spatial displacement between a prediction block of the reference PU and a position within the first target reference picture for the reference PU, wherein a reference index signaled for the current PU indicates a position, within a reference picture list of the current PU, of the target reference picture for the current PU, and wherein a reference picture list index for the reference picture list of the current PU is equal to 1; when the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, determining the IPMVC based on a second motion vector of the reference PU, wherein a second reference index of the reference PU indicates a position, within a second reference picture list of the reference PU, of the second target reference picture for the reference PU, the second reference picture list of the reference PU having a reference picture list index equal to 0, wherein the second motion vector of the reference PU indicates a spatial displacement between the prediction block of the reference PU and a position within the second target reference picture for the reference PU; and determining, based on the IPMVC, a predictive block for the current PU.

In another example, this disclosure describes a method of encoding video data, the method comprising: determining, based at least in part on a disparity vector of a current PU of a current picture, a reference PU for the current PU, wherein the reference PU is in a reference picture that is in the same access unit as the current picture and is in a different view than the current picture, wherein a first reference index for the reference PU indicates a position, within a first reference picture list of the reference PU, of a first target reference picture for the reference PU, and wherein the first reference picture list for the reference PU has a reference picture list index equal to 1; when the first target reference picture for the reference PU is available and a POC value of the first target reference picture for the reference PU matches a POC value of a target reference picture for the current PU, determining an IPMVC based on a first motion vector of the reference PU, wherein the first motion vector of the reference PU indicates a spatial displacement between a prediction block of the reference PU and a position within the first target reference picture for the reference PU, wherein a reference index signaled for the current PU indicates a position, within a reference picture list of the current PU, of the target reference picture for the current PU, and wherein a reference picture list index for the reference picture list of the current PU is equal to 1; when the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, determining the IPMVC based on a second motion vector of the reference PU, wherein a second reference index of the reference PU indicates a position, within a second reference picture list of the reference PU, of the second target reference picture for the reference PU, the second reference picture list of the reference PU having a reference picture list index equal to 0, wherein the second motion vector of the reference PU indicates a spatial displacement between the prediction block of the reference PU and a position within the second target reference picture for the reference PU; and including, in a bitstream, data indicating a reference index that indicates a position, within a reference picture list of the current PU, of the target reference picture for the current PU.

In another example, this disclosure describes a video coding device comprising a memory configured to store data associated with a current prediction unit (PU) of a current picture; and one or more processors configured to: determine, based at least in part on a disparity vector of the current PU, a reference PU for the current PU, wherein the reference PU is in a reference picture that is in the same access unit as the current picture and is in a different view than the current picture, wherein a first reference index for the reference PU indicates a position, within a first reference picture list of the reference PU, of a first target reference picture for the reference PU, and wherein the first reference picture list for the reference PU has a reference picture list index equal to 1; when the first target reference picture for the reference PU is available and a POC value of the first target reference picture for the reference PU matches a POC value of a target reference picture for the current PU, determine an IPMVC based on a first motion vector of the reference PU, wherein the first motion vector of the reference PU indicates a spatial displacement between a prediction block of the reference PU and a position within the first target reference picture for the reference PU, wherein a reference index signaled for the current PU indicates a position, within a reference picture list of the current PU, of the target reference picture for the current PU, and wherein a reference picture list index for the reference picture list of the current PU is equal to 1; when the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, determine the IPMVC based on a second motion vector of the reference PU, wherein a second reference index of the reference PU indicates a position, within a second reference picture list of the reference PU, of the second target reference picture for the reference PU, the second reference picture list of the reference PU having a reference picture list index equal to 0, wherein the second motion vector of the reference PU indicates a spatial displacement between the prediction block of the reference PU and a position within the second target reference picture for the reference PU.

In another example, this disclosure describes a video coding device comprising: means for determining, based at least in part on a disparity vector of a current PU of a current picture, a reference PU for the current PU, wherein the reference PU is in a reference picture that is in the same access unit as the current picture and is in a different view than the current picture, wherein a first reference index for the reference PU indicates a position, within a first reference picture list of the reference PU, of a first target reference picture for the reference PU, and wherein the first reference picture list for the reference PU has a reference picture list index equal to 1; means for determining, when the first target reference picture for the reference PU is available and a POC value of the first target reference picture for the reference PU matches a POC value of a target reference picture for the current PU, an IPMVC based on a first motion vector of the reference PU, wherein the first motion vector of the reference PU indicates a spatial displacement between a prediction block of the reference PU and a position within the first target reference picture for the reference PU, wherein a reference index signaled for the current PU indicates a position, within a reference picture list of the current PU, of the target reference picture for the current PU, and wherein a reference picture list index for the reference picture list of the current PU is equal to 1; means for determining, when the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, the IPMVC based on a second motion vector of the reference PU, wherein a second reference index of the reference PU indicates a position, within a second reference picture list of the reference PU, of the second target reference picture for the reference PU, the second reference picture list of the reference PU having a reference picture list index equal to 0, wherein the second motion vector of the reference PU indicates a spatial displacement between the prediction block of the reference PU and a position within the second target reference picture for the reference PU.

In another example, this disclosure describes a non-transitory computer-readable data storage medium having instructions stored thereon that when executed configure a video coding device to: determine, based at least in part on a disparity vector of a current PU of a current picture, a reference PU for the current PU, wherein the reference PU is in a reference picture that is in the same access unit as the current picture and is in a different view than the current picture, wherein a first reference index for the reference PU indicates a position, within a first reference picture list of the reference PU, of a first target reference picture for the reference PU, and wherein the first reference picture list for the reference PU has a reference picture list index equal to 1; when the first target reference picture for the reference PU is available and a POC value of the first target reference picture for the reference PU matches a POC value of a target reference picture for the current PU, determine an IPMVC based on a first motion vector of the reference PU, wherein the first motion vector of the reference PU indicates a spatial displacement between a prediction block of the reference PU and a position within the first target reference picture for the reference PU, wherein a reference index signaled for the current PU indicates a position, within a reference picture list of the current PU, of the target reference picture for the current PU, and wherein a reference picture list index for the reference picture list of the current PU is equal to 1; when the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, determine the IPMVC based on a second motion vector of the reference PU, wherein a second reference index of the reference PU indicates a position, within a second reference picture list of the reference PU, of the second target reference picture for the reference PU, the second reference picture list of the reference PU having a reference picture list index equal to 0, wherein the second motion vector of the reference PU indicates a spatial displacement between the prediction block of the reference PU and a position within the second target reference picture for the reference PU.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 7 is an example table that indicates an example specification of l0CandIdx and l1CandIdx.

DETAILED DESCRIPTION

Figure 1:
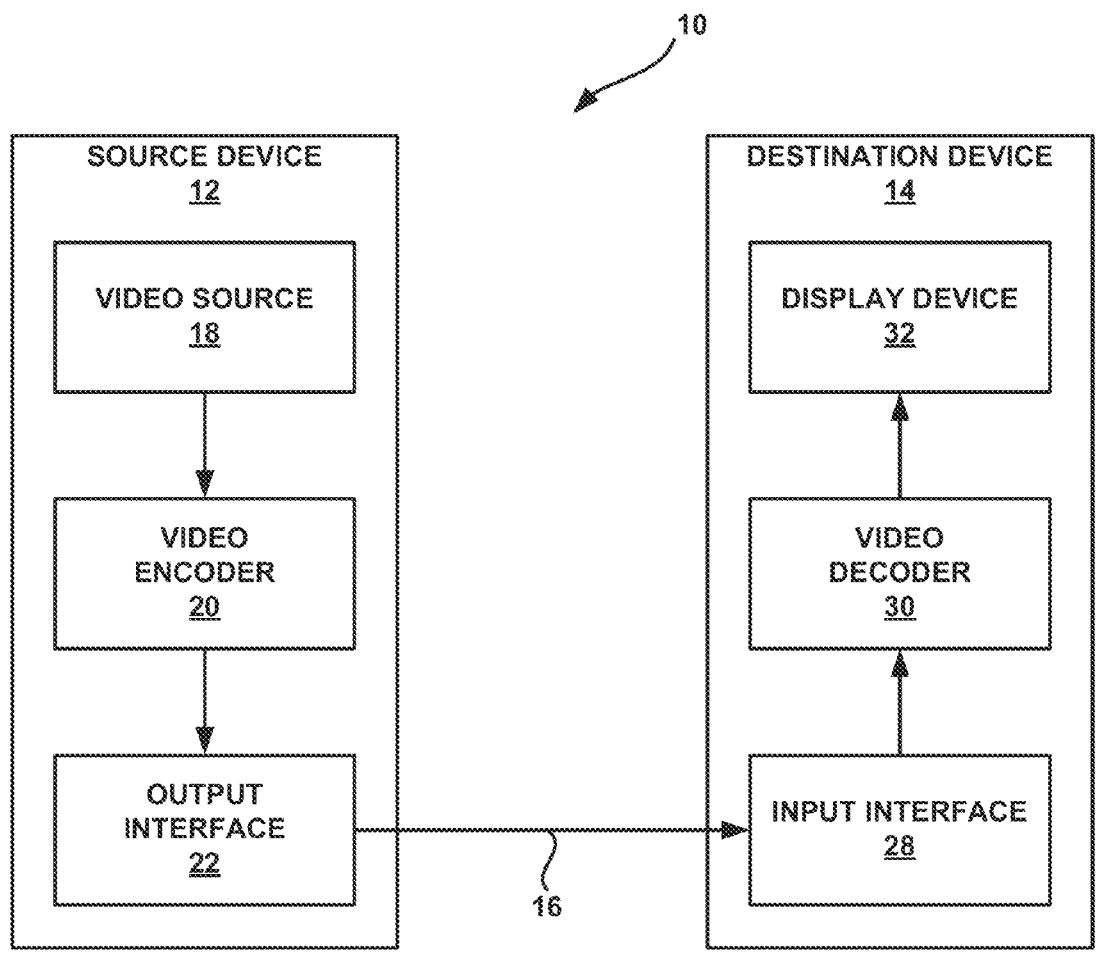
FIG. 1 is a block diagram illustrating an example video coding system that may utilize the techniques described in this disclosure.

In High-Efficiency Video Coding (HEVC) and other video coding standards or specifications, a video encoder may partition a picture into prediction blocks. Each of the prediction blocks may be associated with a prediction unit (PU). The video encoder may use intra prediction or inter prediction to generate predictive blocks for the PUs. A predictive block for a PU may be a predicted version of the prediction block of the PU. When the video encoder uses intra prediction to generate a predictive block for a PU of a current picture, the video encoder generates the predictive block based on samples (i.e., pixel sample values) in the current picture. In at least some instances in this disclosure, the phrase "based on" may be interpreted as "based at least in part on." When the video encoder uses inter prediction to generate a predictive block of a PU of a current picture, the video encoder may generate the predictive block based on samples in one or more reference pictures.

To support inter prediction, the video encoder may generate one or more reference picture lists. These reference picture lists may be referred to as RefPicList0 and RefPicList1. In some examples, the video encoder may generate different reference picture lists for different pictures or different slices of pictures. Hence, different PUs of different pictures and/or slices may be associated with different versions of RefPicList0 and RefPicList1.

Furthermore, when the video encoder uses inter prediction to generate a predictive block of a PU, the video encoder may signal motion information for the PU. The motion information may include a reference index for the PU, a motion vector for the PU, and one or more prediction direction indicators. The reference index for the PU may indicate a position, within one of the reference picture lists associated with the PU, of a reference picture. The motion vector for the PU may indicate a spatial displacement between a prediction block of the PU and a reference location in the reference picture. The video encoder may use actual or interpolated samples of the reference picture associated with the reference location to generate a predictive block for the PU. Because the PU may be associated with two reference pictures, the PU may have two reference indexes and two motion vectors. Hence, a PU may have a RefPicList0 reference index and a RefPicList1 reference index. The PU's RefPicList0 reference index indicates a reference picture in the PU's version of RefPicList0. The PU's RefPicList1 reference index indicates a reference picture in the PU's version of RefPicList1. This disclosure may refer to a reference picture indicated by a reference index as a "target" reference picture. Similarly, the PU may have a RefPicList0 motion vector and a RefPicList1 motion vector. The PU's RefPicList0 motion vector may indicate a reference location in a reference picture in the PU's version of RefPicList0. The PU's RefPicList1 motion vector may indicate a reference location in a reference picture in the PU's version of RefPicList1.

The video encoder may signal a PU's reference indexes and motion vectors in a bitstream. In other words, the video encoder may include, in the bitstream, data that indicate the PU's reference indexes and motion vectors. A video decoder may reconstruct the PU's versions of RefPicList0 and/or RefPicList1 and may use the PU's reference indexes and motion vectors to determine one or more predictive blocks for the PU. The video decoder may use the predictive blocks for the PU, along with residual data, to decode samples.

For ease of explanation, this disclosure may use the term "RefPicListX" to denote either RefPicList0 or RefPicList1. Furthermore, this disclosure may use the term "RefPicListY" in conjunction with the term "RefPicListX." If RefPicListX denotes RefPicList0, RefPicListY denotes RefPicList1. If RefPicListX denotes RefPicList1, RefPicListY denotes RefPicList0. That is, the letter "Y" in RefPicListY may be equal to 1−X.

The video encoder may signal RefPicListX motion information (e.g., the RefPicListX reference index and the RefPicListX motion vector) of a current PU using advanced motion vector prediction (AMVP) mode. When the video encoder signals the RefPicListX motion information of the current PU using AMVP mode, the video encoder may generate an AMVP candidate list that includes a set of AMVP candidates. The AMVP candidate list may include AMVP candidates that specify motion vectors of PUs that spatially or temporally neighbor the current PU. Furthermore, the video encoder may select an AMVP candidate from the AMVP candidate list. The video encoder may generate a RefPicListX motion vector difference (MVD) for the current PU. The RefPicListX MVD may indicate a difference between the RefPicListX motion vector of the current PU and a motion vector of the selected AMVP candidate. The video encoder may signal the RefPicListX MVD for the current PU, a RefPicListX reference index for the current PU, and a RefPicListX motion vector predictor (MVP) flag for the current PU. The RefPicListX MVP flag may indicate a position, within the AMVP candidate list, of the selected AMVP candidate. In this disclosure, the term "RefPicListX target reference picture" of a PU may be used to denote a reference picture indicated by a RefPicListX reference index of the PU.

The video decoder may reconstruct the same AMVP candidate list and may determine the selected AMVP candidate based on the RefPicListX MVP flag. The video decoder may then determine the RefPicListX motion vector of the current PU by adding the RefPicListX MVD to a motion vector specified by the selected AMVP candidate. In addition, the video decoder may use the current PU's RefPicListX motion vector to determine a reference location in the current PU's RefPicListX target reference picture. The video decoder may generate a predictive block for the current PU based on samples associated with the reference location in the current PU's RefPicListX target reference picture.

There is currently an effort to generate a multiview or 3-dimensional video coding (3DV) extension to HEVC, referred to as 3D-HEVC. 3D-HEVC provides for multiple views of the same scene from different viewpoints. In 3D-HEVC, pictures of different views occurring at the same time instance are in the same "access unit." 3D-HEVC supports inter-view prediction. Inter-view prediction is similar to the motion compensation used in standard HEVC and may use the same syntax elements. A picture order count (POC) value is a variable that is associated with each picture that indicates the position of the associated picture in output order relative to the output order positions of the other pictures in the same coded video sequence. Thus, each picture in an access unit may be associated with the same POC value and pictures in different access units may be associated with different POC values.

However, when a video coder (e.g., a video encoder or a video decoder) performs inter-view prediction on a PU, the video coder may use, as a reference picture, a picture that is in the same access unit as the PU, but in a different view. This disclosure may use the term "inter-view reference picture" of a picture to refer to a reference picture that is in the same access unit as the picture but in a different view than the picture. In contrast, conventional motion compensation only uses reference pictures in different access units than a current picture (i.e., temporal reference pictures).

As mentioned above, a video coder may generate an AMVP candidate list when the motion information of a current PU is signaled using AMVP mode. In 3D-HEVC, a video coder may determine whether the current PU's RefPicListX target reference picture is an inter-view reference picture. If so, the video coder may include a disparity vector for the current PU in the AMVP candidate list. In some examples, the disparity vector for the current PU indicates a horizontal spatial displacement between the current PU and a location within an inter-view reference picture. In other examples, the disparity vector for the current PU may indicate a horizontal and a vertical spatial displacement between the current PU and a location within an inter-view reference picture.

Otherwise, if the current PU's RefPicListX target reference picture is not an inter-view reference picture, the candidate list may include an inter-view motion vector candidate (IPMVC). The video coder may use the IPMVC in the same way that the video coder uses the other AMVP candidates in the AMVP candidate list. For instance, if the motion information of the current PU is signaled using AMVP mode and the IPMVC is the selected AMVP candidate for RefPicListX, a video coder may derive a motion vector of the current PU based on the motion vector specified by the IPMVC.

The video coder may determine the IPMVC based a motion vector of a reference PU. The reference PU may be a PU of an inter-view reference picture. To determine the reference PU, the video coder may determine a disparity vector for the current PU. The reference PU may be the PU of the reference picture that covers the location indicated by the disparity vector for the current PU. In this disclosure, a PU (or other type of video unit) may be said to "cover" a location if a prediction unit (or other type of sample block associated with the video unit) includes the location. Furthermore, in this disclosure, the reference picture indicated by the reference PU's RefPicListX reference index may be referred to as the reference PU's RefPicListX target reference picture.

When the current PU's RefPicList0 motion vector is coded in AMVP mode and the video coder is determining an IPMVC for use in prediction of the current PU's RefPicList0 motion vector, the video coder may determine whether the reference PU's RefPicList0 reference index is greater than or equal to 0. In other words, the video coder may determine whether the reference PU's RefPicList0 target reference picture is available. If the reference PU's RefPicList0 target reference picture is available, the video coder may determine whether the reference PU's RefPicList0 target reference picture has a POC value that matches the POC value of the reference picture indicated by the current PU's RefPicList0 reference index (i.e., the current PU's RefPicList0 target reference picture). If so, the video coder may determine that the IPMVC is equal to the reference PU's RefPicList0 motion vector. Otherwise, if the reference PU's RefPicList0 target reference picture is not available, the video coder may determine whether the reference PU's RefPicList1 target reference picture is available. If the reference PU's RefPicList1 target reference picture is available, the video coder may determine whether the reference PU's RefPicList1 target reference picture has a POC value that matches the POC value of the current PU's RefPicList0 target reference picture. If so, the video coder may determine that the IPMVC is equal to the reference PU's RefPicList1 motion vector.

The video coder may perform a similar process when the current PU's RefPiclist1 motion vector is coded in AMVP mode and the video coder is determining an IPMVC for use in prediction of the current PU's RefPicList1 motion vector. Thus, when generating an AMVP candidate list for determining the current PU's RefPicList1 motion vector, the video coder may determine whether the reference PU's RefPicList0 target reference picture is available. If the reference PU's RefPicList0 target reference picture is available, the video coder may determine whether the reference PU's RefPicList0 target reference picture has a POC value that matches the POC value of the current PU's RefPicList1 target reference picture. If so, the video coder may determine that the IPMVC is equal to the reference PU's RefPicList0 motion vector. Furthermore, when the video coder is generating the AMVP candidate list for the current PU's RefPicList1 motion vector, if the reference PU's RefPicList0 target reference picture is not available, the video coder may determine whether the reference PU's RefPicList1 target reference picture is available. If the reference PU's RefPicList1 target reference picture is available, the video coder may determine whether the reference PU's RefPicList1 target reference picture has a POC value that matches the POC value of the current PU's RefPicList1 target reference picture. If so, the video coder may determine that the IPMVC is equal to the reference PU's RefPicList1 motion vector.

This process of determining an IPMVC may be generalized as follows. When the current PU's RefPicListX motion vector is coded in AMVP mode and the video coder is determining an IPMVC for use in prediction of the current PU's RefPicListX motion vector, the video coder may determine whether the reference PU's RefPicList0 target reference picture is available and whether the POC value of the reference PU's RefPicList0 target reference picture matches a POC value of the current PU's RefPicListX target reference picture. If so, the video coder may determine the IPMVC based on the RefPicList0 motion vector of the reference PU. Otherwise, if the reference PU's RefPicList1 target reference picture is available and the POC value of the reference PU's RefPicList1 target reference picture matches a POC value of the current PU's RefPicListX target reference picture, the video coder may determine the IPMVC based on the RefPicList1 motion vector of the reference PU. Otherwise (the reference PU is intra-coded or the reference PU is inter-view predicted), the video coder may determine that the IPMVC is unavailable.

In the current design of AMVP in 3D-HEVC, the disparity vector derived for a current PU may not be sufficiently accurate. Moreover, if the current PU's RefPicListX reference index indicates a temporal reference picture, an IPMVC is available only when the reference PU contains a motion vector (e.g., a RefPicList0 motion vector or a RefPicList1 motion vector) that points to a location in a reference picture in the same access unit as the reference picture indicated by the RefPicListX reference index of the current PU. In another example problem, if the video coder is generating an AMVP candidate list for determining the current PU's RefPicList1 motion vector, the video coder checks the reference PU's RefPicList0 first and then checks the reference PU's RefPicList1. This does not align with the derivation process for IPMVCs in merge mode. Consequently, separate software and/or hardware may be necessary for determining IPMVCs for AMVP mode and merge mode.

One or more of the example techniques of this disclosure may address the problems indicated above. For instance, when the video coder is determining an IPMVC for use in predicting the current PU's RefPicListX motion vector (where X is a reference picture list index equal to 0 or 1), if a RefPicListX reference picture of a reference PU is available and has a POC value that matches a POC value of a RefPicListX target reference picture for the current PU, the video coder may determine an IPMVC based on the RefPicListX motion vector of the reference PU. Otherwise, if the reference PU's RefPicListX target reference picture is not available or the POC value of the reference PU's RefPicListX target reference picture does not match the POC value of the current PU's RefPicListX target reference picture, the video coder may determine whether a RefPicListY target reference picture (where Y is a reference picture list index equal to 1−X) of the reference PU is available and has a POC value that matches the POC value of the current PU's RefPicListX target reference picture. If the reference PU's RefPicListY target reference picture is available and has a POC value that matches the POC value of the current PU's RefPicListX target reference picture, the video coder may determine the IPMVC based on the reference PU's RefPicListY motion vector. For instance, the video coder may determine the IPMVC such that the IPMVC is equal to the reference PU's RefPicListY motion vector. Otherwise, in some examples, if the RefPicListY reference picture of the reference PU is not available or the POC value of the RefPicListY reference picture does not match the POC value of the RefPicListX target reference picture for the current PU, the video coder does not determine the IPMVC. Determining the IPMVC in this way may align the process for determining the IPMVC in AMVP mode with the process for determining the IPMVC in merge mode. Hence, the techniques of this disclosure may reduce complexity of hardware and/or software of video coders.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASIC's), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video encoder 20 and video decoder 30 are described in this disclosure, for purposes of illustration, as being configured to operate according to one or more video coding standards. However, the techniques of this disclosure are not necessarily limited to any particular coding standard, and may be applied for a variety of different coding standards. Examples of other proprietary or industry standards include the ITU-T H.261, ISO/IEC MPEG-1 Visual, ITU-T H.262 or ISO/IEC MPEG-2 Visual. ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, or extensions of, modifications of, or additions to, such standards. Furthermore, there is an ongoing effort to generate a three-dimensional video (3DV) coding extension to H.264/AVC, namely AVC-based 3DV.

In the example of FIG. 1, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11$^{th}$ Meeting, Shanghai, China, October 2012.

Furthermore, there are ongoing efforts to produce SVC, multi-view coding, and 3DV extensions for HEVC. The SVC extension of HEVC may be referred to as SHEVC. The multi-view coding extension of HEVC may be referred to as MV-HEVC. The 3DV extension of HEVC may be referred to as 3D-HEVC. For MV-HEVC, it may be guaranteed that there are only high-level syntax (HLS) changes, such that no module in the coding unit (CU)/PU level in HEVC needs to be redesigned and each module in the CU/PU level in HEVC may be fully re-used. The non-extended version of HEVC may be referred to as base HEVC.

3D-HEVC is based, at least in part, on solutions proposed in Schwarz et al, "Description of 3D Video Coding Technology Proposal by Fraunhofer HHI (HEVC compatible configuration A), ISO/IEC JTC1/SC29/WG11, Doc. MPEG 11/M22570, Geneva, Switzerland, November/December 2011, and Schwarz et al, "Description of 3D Video Coding Technology Proposal by Fraunhofer HHI (HEVC compatible configuration B), ISO/IEC JTC1/SC29/WG11, Doc. MPEG 11/M22571, Geneva, Switzerland, November/December 2011. A reference software description for 3D-HEVC is available at Schwarz et al., "Test Model under Consideration for HEVC based 3D video coding," ISO/IEC JTC1/SC29/WG11 MPEG2011/N12559, San Jose, USA, February 2012. Reference software, namely HTM version 3.0 is available, as of Nov. 20, 2013, from https://hevc.hhi.fraunhofer.de/svn/svn_3DVCSoftware/tags/HTM-5.0/. Furthermore, Tech et al., "3D-HEVC Test Model 2," Joint Collaborative Team on 3D Video Coding Extension Development of ITU-T SG 16 WP 3 and ISO/IEC JTC 1/SC 29/WG 11, 2$^{nd}$ Meeting, Shanghai, CN, October 2012, document JCT3V-B1005_d0, which is available as of Nov. 20, 2013, from http://phenix.it-sudparis.eu/jct2/doc_en-d_user./document/2_Shanghai/wg11/JCT3V-B1005-v1.zip (hereinafter, "3D-HEVC Test Model 2") describes a test model for 3D-HEVC. For 3D-HEVC, new coding tools, including those at the CU/PU level, for both texture and depth views may be included and supported.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture comprising separate color planes, a CTU may comprise a single coding tree block and syntax structures used to code the samples of the single coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively according to a scanning order (e.g., a raster scanning order).

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In a monochrome picture or a picture comprising separate color planes, a CU may comprise a single coding block and syntax structures used to code the samples of the single coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. Video encoder 20 may generate predictive luma, Cb, and Cr blocks for luma, Cb, and Cr prediction blocks of each PU of the CU. In a monochrome picture or a picture comprising separate color planes, a PU may comprise a single prediction block and syntax structures used to predict the single prediction block.

Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional (i.e., uni-prediction) or bi-directional (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in a predictive luma block of a PU of the CU and a corresponding sample in the CU's original luma coding block. In addition, video encoder 20 may generate a Cb residual block for the CU. Each sample in the CU's Cb residual block may indicate a difference between a Cb sample in a predictive Cb block of a PU of the CU and a corresponding sample in the CU's original Cb coding block. Video encoder 20 may also generate a Cr residual block for the CU. Each sample in the CU's Cr residual block may indicate a difference between a Cr sample in a predictive Cr block of a PU of the CU and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In a monochrome picture or a picture comprising separate color planes, a TU may comprise a single transform block and syntax structures used to transform the samples of the single transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. Each of the NAL units may include a NAL unit header and may encapsulate a raw byte sequence payload (RBSP). The NAL unit header may include a syntax element that indicates a NAL unit type code. The NAL unit type code specified by the NAL unit header of a NAL unit indicates the type of the NAL unit. A RBSP may comprise a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

Video decoder 30 may receive a bitstream. In addition, video decoder 30 may parse the bitstream to obtain syntax elements from the bitstream. Video decoder 30 may reconstruct the pictures of the video data based on the syntax elements obtained from the bitstream. The process to reconstruct the video data may be generally reciprocal to the process performed by video encoder 20 to encode the video data. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

When video encoder 20 begins encoding a current picture, video encoder 20 may generate five subsets of reference pictures (i.e., reference picture subsets) for the current picture. In some examples, these five reference picture subsets are: RefPicSetStCurrBefore, RefPicSetStCurrAfter, RefPicSetStFoll, RefPicSetLtCurr, and RefPicSetLtFoll. This disclosure may refer to the reference pictures in RefPicSetStCurrBefore, RefPicSetStCurrAfter, RefPicSetStFoll as "short-term reference pictures," "short-term pictures," or "STRPs." Thus, a "short-term reference picture" may be a picture that is marked (e.g., by virtue of being in RefPicSetStCurrBefore, RefPicSetStCurrAfter, or RefPicSetStFoll) as being used for short-term reference. This disclosure may refer to the reference pictures in RefPicSetLtCurr and RefPicSetLtFoll as "long-term reference pictures," "long-term pictures," or "LTRPs." The video encoder may re-generate the five reference picture subsets for each picture.

Furthermore, when a current slice of the current picture is a P slice (i.e., a slice in which intra prediction and uni-directional inter prediction are enabled), video encoder 20 may use the reference pictures from the RefPicStCurrAfter, RefPicStCurrBefore, and RefPicStLtCurr reference picture subsets of the current picture to generate a single reference picture list (RefPicList0) for the current slice. When the current slice is a B slice (i.e., a slice in which intra prediction, uni-directional inter prediction, and bi-directional inter prediction are enabled), video encoder 20 may use the reference pictures from the RefPicStCurrAfter, RefPicStCurrBefore, and RefPicStLtCurr reference picture subsets of the current picture to generate two reference picture lists (RefPicList0 and RefPicList1) for the current slice. Video encoder 20 may include, in a slice header for a first slice of the current picture, syntax elements that video decoder 30 may use to determine the reference picture subsets of the current picture. When video decoder 30 decodes a current slice of the current picture, video decoder 30 may determine the reference picture subsets of the current picture and may regenerate RefPicList0 and/or RefPicList1.

As indicated above, when a video coder (e.g., video encoder 20 or video decoder 30) begins coding a current slice of a picture, the video coder may initialize a first reference picture list (i.e., RefPicList0). Furthermore, if the current slice is a B slice, the video coder may initialize a second reference picture list (i.e., RefPicList1). In some examples, reference picture list initialization is an explicit mechanism that puts reference pictures in a reference picture memory (i.e., a decoded picture buffer) into a list based on the order of POC values of the reference pictures.

To generate RefPicList0, a video coder (e.g., a video encoder or a video decoder) may generate an initial, default version of RefPicList0. In the initial version of RefPicList0, reference pictures in RefPicSetStCurrBefore are listed first, followed by reference pictures in RefPicSetStCurrAfter, followed by reference pictures in RefPicSetLtCurr. Thus, the RefPicList0 for a picture (and hence any PU of the picture) may be characterized in that prior to application of any Reference Picture List Modification (RPLM) process to RefPicList0, each STRP in RefPicList0 having a POC value less than a POC value of the picture occurs in RefPicList0 before any STRP in RefPicList1 having a POC value greater than the POC value of the picture.

Similarly, to generate RefPicList1, the video coder may generate an initial version of RefPicList1. In the initial version of RefPicList1, reference pictures in RefPicSetStCurrAfter are listed first, followed by reference pictures in RefPictSetStCurrBefore, followed by reference pictures in RefPicSetLtCurr. Thus, the RefPicList1 for a picture (and hence any PU of the picture) may be characterized in that prior to application of any RPLM process to RefPicList1, each STRP in RefPicList1 having a POC value less than a POC value of the picture occurs in RefPicList1 after each STRP in RefPicList1 having a POC value greater than the POC value of the picture.

After a video coder has initialized a reference picture list (e.g., RefPicList0 or RefPicList1), the video coder may modify the order of the reference pictures in the reference picture list. In other words, the video coder may perform a reference picture list modification (RPLM) process. The video coder may modify the order of the reference pictures in any order, including the case where one particular reference picture may appear at more than one position in the reference picture list. In other words, the reference picture list reordering mechanism can modify the position of a picture that was put in the list during the reference picture list initialization to any new position, or put any reference picture in the reference picture memory in any position, even if the picture does not belong in the initialized list. Some pictures after the reference picture list reordering (modification) may be put in a very further position in the list. However, if a position of a picture exceeds the number of active reference pictures of the list, the picture is not considered as an entry of the final reference picture list. A slice header may include one or more syntax elements that indicate the number of active reference pictures in the reference picture lists. Thus, typically a reference picture list construction for the first or second reference picture list of a B picture includes two steps: reference picture list initialization and reference picture list reordering (i.e., modification).

In some examples, video encoder 20 may signal the motion information of a PU using merge mode or advanced motion vector prediction (AMVP) mode. In other words, in HEVC, there are two modes for the prediction of motion parameters, one being the merge mode and the other being AMVP. Motion prediction may comprise the determination of motion information of a video unit (e.g., a PU) based on motion information of one or more other video units. The motion information of a PU may include motion vector(s) of the PU and reference index(s) of the PU.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a predictive block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX motion information of a current PU using AMVP mode, video encoder 20 may signal a RefPicListX MVD for the current PU and a RefPicListX reference index for the current PU in addition to signaling a RefPicListX MVP flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

Figure 2:
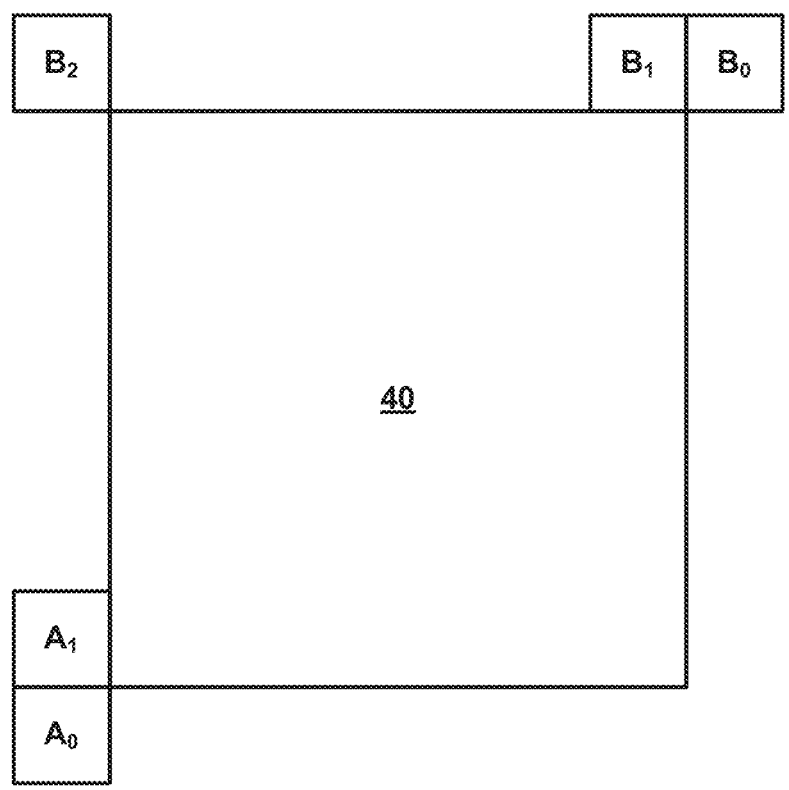
FIG. 2 is a conceptual diagram illustrating example spatially-neighboring prediction units relative to a current prediction unit.

When video decoder 30 generates an AMVP candidate list for a current PU, video decoder 30 may derive one or more AMVP candidates based on the motion information of PUs (i.e., spatially-neighboring PUs) that cover locations that spatially neighbor the current PU. FIG. 2 is a conceptual diagram illustrating example spatially-neighboring PUs relative to a current PU 40. In the example of FIG. 2, the spatially-neighboring PUs may be PUs that cover the locations indicated as $A_0$, $A_1$, $B_0$, $B_1$, and $B_2$. A PU may cover a location when a prediction block of the PU includes the location.

With regard to the example of FIG. 2, a luma location (xP, yP) may specify the top-left luma sample of PU 40 relative to a top-left luma sample of the current picture. Furthermore, the variables nPSW and nPSH may respectively denote the width and height, in luma samples, of PU 40. The top-left luma sample of a PU N relative to the top-left sample of the current picture is (xN, yN), where N denotes a PU covering positions $A_0$, $A_1$, $B_0$, $B_1$, or $B_2$. For PUs covering positions $A_0$, $A_1$, $B_0$, $B_1$, or $B_2$, (xN, yN) may be defined as (xP−1, yP+nPSH), (xP−1, yP+nPSH−1), (xP+nPSW, yP−1), (xP+nPSW−1, yP−1) or (xP−1, yP−1), respectively.

The motion information of the spatially-neighboring PU may include a RefPicList0 reference index and/or a RefPicList1 reference index. Thus, for a given spatial block, its motion information is used to derive an AMVP candidate of the current PU with its decoded reference index equal to ref_idx_lX (with X being equal to 0 or 1, corresponding to RefPicList0 or RefPicList1) as follows.

First, the video coder may determine whether RefIdxLX is available, where RefIdxLX is a RefPicListX reference index of the spatially-neighboring PU. RefIdxLX may be available if RefIdxLX is greater than or equal to 0. Furthermore, the video coder may determine whether RefIdxLX is equal to ref_idx_lX, where ref_idx_lX is the signaled (and decoded) RefPicListX reference index of the current PU. If RefIdxLX is available and RefIdxLX is equal to ref_idx_lX, the video coder may set the AMVP candidate to mvLX, where mvLX is the RefPicListX motion vector of the spatially-neighboring PU.

Second, if RefIdxLX is not available or RefIdxLX is not equal to ref_idx_lX, the video coder may determine whether RefIdxLY is available, where Y is equal to 1−X and RefIdxLY is a RefPicListY reference index of the spatially-neighboring PU. RefIdxLY may be available if RefIdxLY is greater than or equal to 0. Furthermore, the video decoder may determine whether a reference picture indicated in RefPicListY by RefIdxLY (i.e., RefPicListY[RefIdxLY]) has the same POC value as the reference picture indicated in RefPicListX by ref_idx_lX (i.e., RefPicListX[ref_idx_lX]. If RefIdxLY is available and RefPicListY[RefIdxLY] has the same POC value as RefPicListX[ref_idx_lX], the video coder may set the AMVP candidate to mvLY, where mvLY is the RefPicListY motion vector of the spatially-neighboring PU.

Third, the video coder may determine whether RefIdxLX is available and the reference picture in RefPicListX indicated by RefIdxLX (i.e., RefPicListX[RefIdxLX]) and RefPicListX[ref_idx_lX] are both short-term reference pictures or if RefIdxLX is available and RefPicListX[RefIdxLX] and RefPicListX[ref_idx_lX] are both long-term reference pictures. If RefIdxLX is available and RefPicListX[RefIdxLX] and RefPicListX[ref_idx_lX] are both short-term reference pictures or if RefIdxLX is available and RefPicListX[RefIdxLX] and RefPicListX[ref_idx_lX] are both long-term reference pictures, the video coder may set the AMVP candidate to mvLX. Furthermore, if both of RefPicListX[RefIdxLX] and RefPicListX[ref_idx_lX] are short-term reference pictures, the video coder may scale mvLX based on POC distance. A POC distance is the difference between POC values for pictures.

Fourth, if RefIdxLX is not available, if RefPicListX[RefIdxLX] is a short-term reference picture and RefPicListX[ref_idx_lX] is a long-term reference picture, or if RefPicListX[RefIdxLX] is a long-term reference picture and RefPicListX[ref_idx_lX] is a short-term reference picture, the video coder may determine whether RefIdxLY is available and RefPicListY[RefIdxLY] and RefPicListX[ref_idx_lX] are both short-term reference pictures or RefIdxLY is available and RefPicListY[RefIdxLY] and RefPicList[ref_idx_lX] are both long-term reference pictures. If RefIdxLY is available and RefPicListY[RefIdxLY] and RefPicListX[ref_idx_lX] are both short-term reference pictures or RefIdxLY is available and RefPicListY[RefIdxLY] and RefPicList[ref_idx_lX] are both long-term reference pictures, the video coder may set the AMVP candidate to mvLY. Furthermore, if both RefPicListY[RefIdxLY] and RefPicListX[ref_idx_lX] are short-term reference pictures, the video coder may scale mvLY based on POC distance.

Fifth, otherwise, if none of the conditions described in the first four steps apply, the video coder does not, in some examples, derive the AMVP candidate from the current block position.

The video coder may perform the first and second steps described above for each spatially-neighboring PU located at the left side of the current PU, i.e., PUs covering locations $A_0$ and $A_1$ in order. If the video coder does not find an AMVP candidate, the video coder may perform the third, fourth, and fifth steps described above for the PUs covering locations $A_0$ and $A_1$ in order until the video coder finds an AMVP candidate. In this disclosure, the video coder is said to "find" or "derive" an AMVP candidate if the video coder sets or generates the AMVP candidate. An AMVP candidate derived from PUs covering locations $A_0$ and $A_1$ may be denoted as mvLXA. If the video coder is unable to find an AMVP candidate by performing the third, fourth, and fifth steps described above for each of the PUs covering locations $A_0$ and $A_1$, the video coder may consider mvLXA to be unavailable.

Furthermore, the video coder may perform the first and second steps described above for each spatially-neighboring PU located at the upper side of the current PU, i.e., PUs covering locations $B_0$, $B_1$, and $B_2$, in order. If the video coder does not find an AMVP candidate by performing the first and second steps for the PUs covering locations $B_0$, $B_1$, and $B_2$, the video coder may perform the third, fourth, and fifth steps described above for PUs covering locations $B_0$, $B_1$, and $B_2$, in order, until the video coder finds an AMVP candidate. An AMVP candidate derived from PUs covering locations $B_0$, $B_1$, and $B_2$ may be denoted as mvLXB. If the video coder is unable to find an AMVP candidate by performing steps 3-5 for each of the PUs covering locations $B_0$, $B_1$, and $B_2$, the video coder may consider mvLXB to be unavailable.

In this way, up to two AMVP candidates, mvLXA and mvLXB, may be derived from spatially-neighboring PUs. If the video coder determines mvLXA and mvLXB are available and that mvLXA and mvLXB are the same, the video coder may prune one of mvLXA or mvLXB. That is, the video coder may remove one of mvLXA or mvLXB from the AMVP candidate list. After pruning, only one of mvLXA and mvLXB remains available. Furthermore, if only one of mvLXA and mvLXB is available, the video coder may insert a temporal motion vector predictor (TMVP) into the AMVP candidate list.

A candidate in a merge candidate list or an AMVP candidate list that is based on the motion information of a PU that temporally neighbors a current PU (i.e., a PU that is in a different time instance than the current PU) may be referred to as a TMVP. To determine a TMVP, a video coder may firstly identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or Ref- PicList1. After a video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list.

The video coder may identify a co-located PU by checking the co-located picture. The TMVP may indicate either the motion information of a right-bottom PU of the CU containing the co-located PU, or the motion information of the right-bottom PU within the center PUs of the CU containing this PU. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process are used to generate a motion candidate for merge mode or AMVP mode, the video coder may scale the motion vectors based on the temporal location (reflected by POC value). For instance, a video coder may increase the magnitude of a motion vector by greater amounts when a difference between the POC values of a current picture and a reference picture is greater than when a difference between the POC values of the current picture and the reference picture is less.

The target reference index of all possible reference picture lists for the temporal merging candidate derived from a TMVP may be always set to 0. However, for AMVP, the target reference index of all possible reference pictures is set equal to the decoded reference index. In HEVC, a sequence parameter set (SPS) may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a TMVP in decoding of the particular picture or a picture after the particular picture in decoding order.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. In some examples, a view component may be a texture view component or a depth view component.

Figure 3:
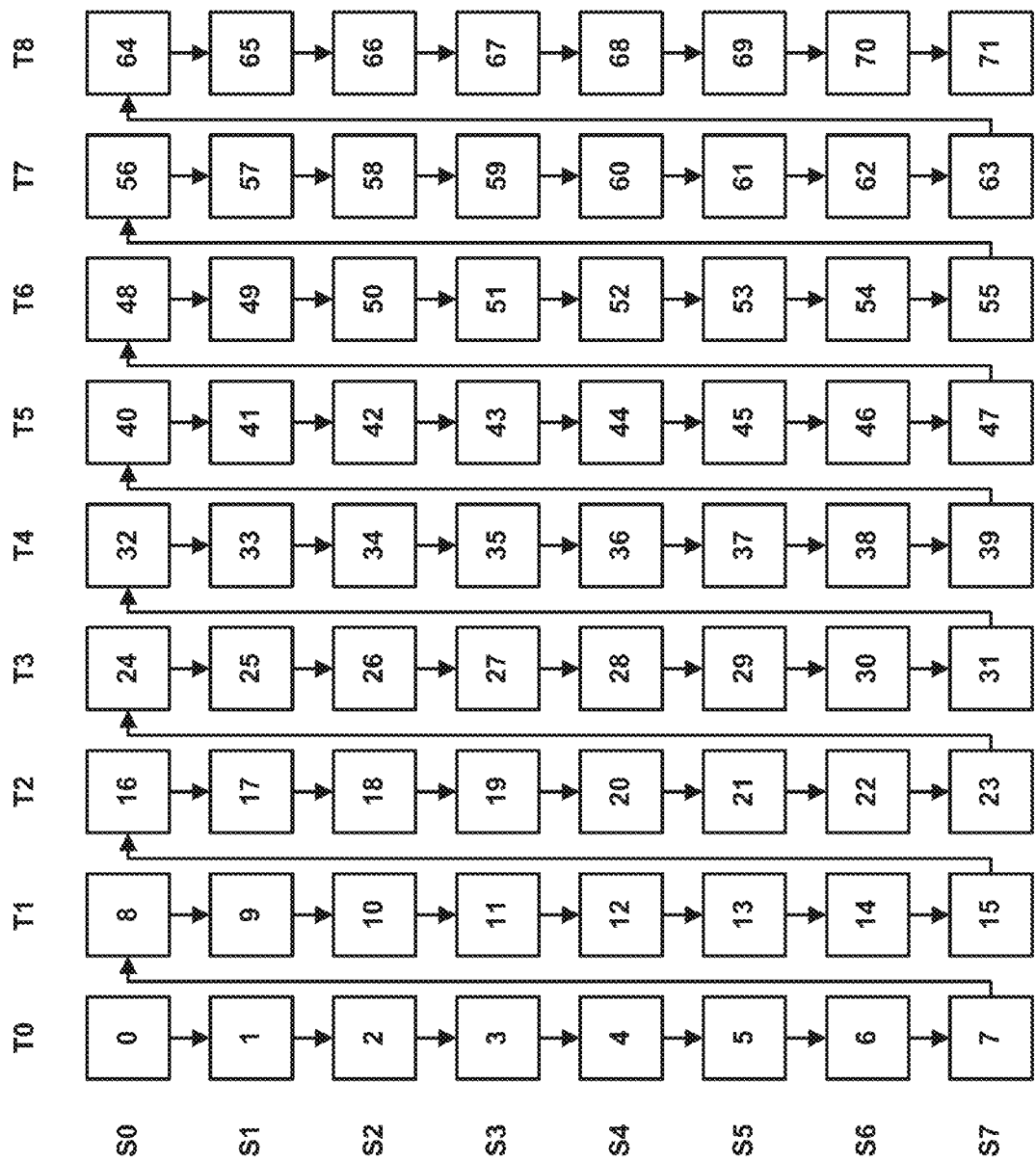
FIG. 3 is a conceptual diagram illustrating an example multi-view coding decoding order.

FIG. 3 is a conceptual diagram illustrating an example multi-view decoding order. The multi-view decoding order may be a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 . . . T11 and the views are labeled S0 . . . S7. Because each view component of an access unit is decoded before any view component of the next access unit, the decoding order of FIG. 3 may be referred to as time-first coding. The decoding order of access units may not be identical to the output or display order of the views.

Multi-view coding may support inter-view prediction. Inter-view prediction is similar to the inter prediction used in H.264/AVC, HEVC, or other video coding specifications and may use the same syntax elements. However, when a video coder performs inter-view prediction on a current video unit (such as a macroblock or PU), the video coder may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in a non-base view, a video coder may add a picture into a reference picture list (e.g., RefPicList0 or RefPicList1) if the picture is in a different view but within a same time instance (i.e., access unit) as the picture that the video coder is currently coding. Like other inter prediction reference pictures, the video coder may insert an inter-view prediction reference picture at any position of a reference picture list.

Figure 4:
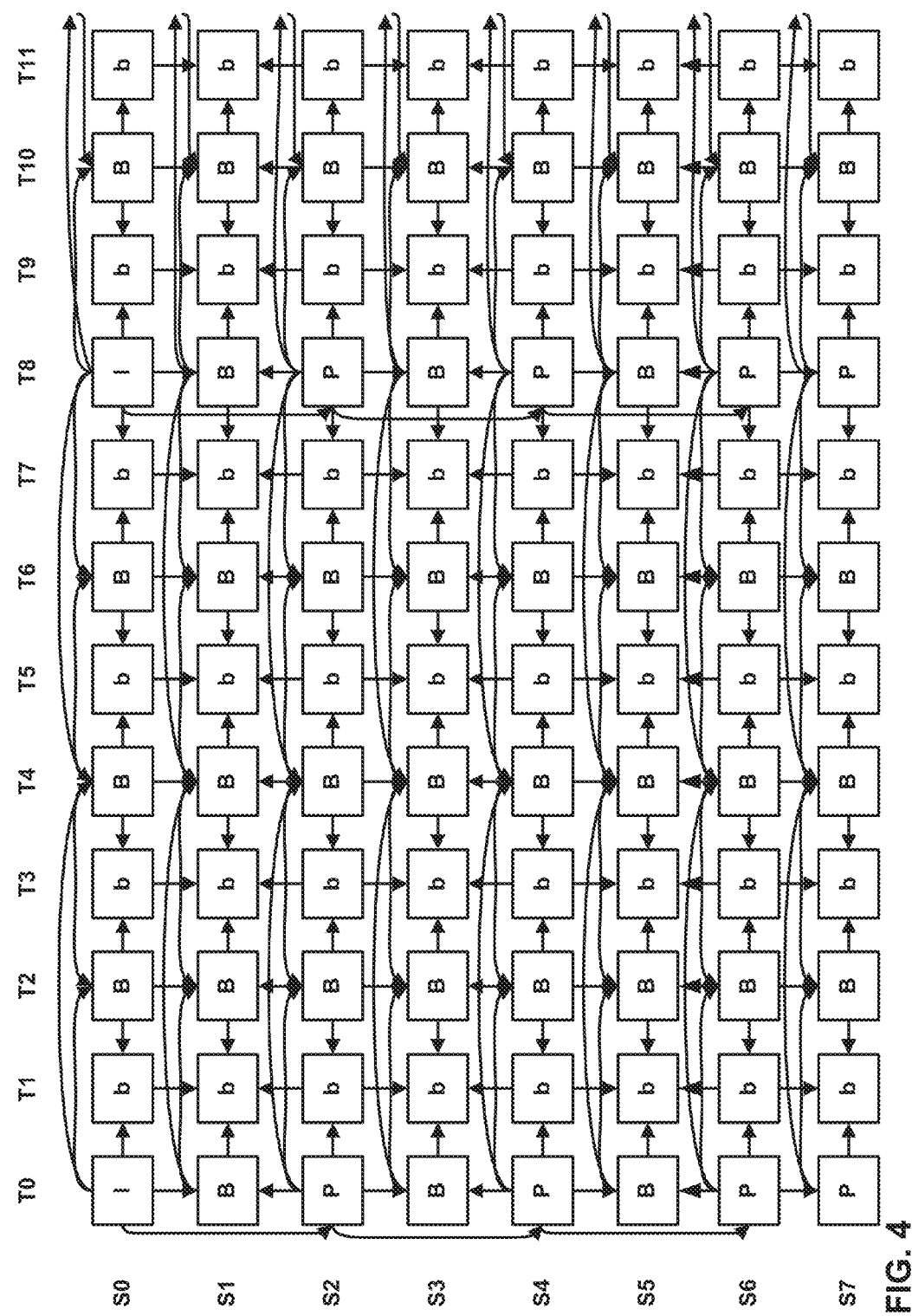
FIG. 4 is a conceptual diagram illustrating an example prediction structure for multi-view coding.

FIG. 4 is a conceptual diagram illustrating an example prediction structure for multi-view coding. The multi-view prediction structure of FIG. 4 includes temporal and inter-view prediction. In the example of FIG. 4, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 4, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multiview representation. Consequently, any renderer with a MVC decoder may expect 3D video contents with more than two views.

In multi-view coding, inter-view prediction may be allowed among pictures in the same access unit (i.e., with the same time instance). When coding a picture in one of the non-base views, a picture may be added into a reference picture list, if the picture is in a different view but with a same time instance. An inter-view prediction reference picture can be put in any position of a reference picture list, just like any inter prediction reference picture. When an inter-view prediction reference picture is used for motion compensation, the corresponding motion vector is referred to as a "disparity motion vector."

As mentioned above, a 3DV extension of HEVC (i.e., 3D-HEVC) is under development. 3D-HEVC may improve coding efficiency using inter-view motion prediction and inter-view residual prediction. In inter-view motion prediction, a video coder may determine (i.e., predict) the motion information of a current PU based on the motion information of a PU in a different view than the current PU. In inter-view residual prediction, a video coder may determine residual blocks of a current CU based on residual data in a different view than the current CU. To enable inter-view motion prediction and inter-view residual prediction, a video coder may determine disparity vectors for PUs. As described elsewhere in this disclosure, the video coder may use the disparity vector either to locate a reference block in another view for inter-view motion/residual prediction or the video coder may convert the disparity vector to a disparity motion vector for inter-view motion prediction.

As mentioned above, a video coder may derive a disparity vector for a current PU. In some examples, the video coder may use the method of Neighboring Blocks Based Disparity Vector (NBDV) to derive the disparity vector for the current PU. That is, to derive a disparity vector for the current PU, a method called NBDV may be used in a test model for 3D-HEVC (i.e., 3D-HTM). NBDV uses disparity motion vectors from spatial and temporal neighboring blocks to derive the disparity vector for the current PU.

In NBDV, the video coder may check, in a fixed checking order, motion vectors of spatially-neighboring and temporally-neighboring PUs. When the video coder checks the motion vector(s) of a spatially-neighboring or temporally-neighboring PU, the video coder may determine whether the motion vector(s) are disparity motion vectors. A disparity motion vector of a PU of a picture is a motion vector pointing to a location within an inter-view reference picture of the picture. An inter-view reference picture of a picture may be a picture that is in the same access unit as the picture, but in a different view. When the video coder identifies a disparity motion vector or an implicit disparity vector (IDV), the video coder may terminate the checking process. An IDV is a disparity vector of a spatially- or temporally-neighboring PU that is coded using inter-view prediction. An IDV may be generated when a PU employs inter-view motion vector prediction, i.e., the candidate for AMVP or merge modes is derived from a reference block in the other view with the help of a disparity vector. Such a disparity vector is called IDV. IDV is stored to the PU for the purpose of disparity vector derivation. Furthermore, when the video coder identifies a disparity motion vector or an IDV, the video coder may return the identified disparity motion vector or IDV. The video coder may convert the returned disparity motion vector or IDV to a disparity vector and may use the disparity vector for inter-view motion prediction and inter-view residual prediction.

If the video coder is unable to derive a disparity vector for the current PU (i.e., if no disparity vector is found), the video coder may use a zero disparity vector as the disparity vector for the current PU. The zero disparity vector is a disparity vector having both horizontal and vertical components equal to 0. In some examples, if the video coder is unable to derive a disparity vector for the current PU, the video coder may disable inter-view residual prediction for the current PU. However, regardless of whether the video coder is able to derive a disparity vector for the current PU, the video coder may use inter-view motion prediction for the current PU. That is, if no disparity vector is found after checking all of the pre-defined neighboring blocks, a zero disparity vector may be used for inter-view motion prediction while inter-view residual prediction may be disabled for the corresponding CU.

As mentioned above, the video coder may check spatially-neighboring PUs as part of the process of determining the disparity vector for the current PU. In some examples, the video coder checks the following spatially-neighboring blocks: the below-left spatially-neighboring block, the left spatially-neighboring block, the above-right spatially-neighboring block, the above spatially-neighboring block, and the above-left spatially-neighboring block. The five spatially-neighboring blocks may cover the locations $A_0$, $A_1$, $B_0$, $B_1$, and $B_2$, respectively, as indicated in FIG. 2. The video coder may check the five spatially-neighboring blocks in the order of $A_1$, $B_1$, $B_0$, $A_0$, and $B_2$. If one of the spatially-neighboring blocks has a disparity motion vector, the video coder may terminate the checking process and the video coder may use the disparity motion vector as the final disparity vector for the current PU.

Furthermore, as mentioned above, the video coder may check temporally-neighboring PUs as part of the process to determine the disparity vector for the current PU. In some examples, the video coder may check up to two reference pictures from the current view for disparity motion vectors. The first reference picture may be the co-located picture. The second reference picture may be a random access picture or a reference picture with a smallest POC value difference and a smallest temporal identifier. The video coder may check the random-access picture first, followed by the co-located picture. For each candidate picture (i.e., the random-access picture and the co-located picture), the video coder may check two blocks. In particular, the video coder may check a center block (CR) and a bottom-right block (BR). The center block may be the center 4×4 block of a co-located region of the current PU. The bottom-right block may be the bottom-right 4×4 block of a co-located region of the current PU. Thus, for each candidate picture, the two blocks are checked in order, CR and BR for the first non-base view or BR, CR for the second non-base view. If one of the PU covering CR or BR has a disparity motion vector, the video coder may terminate the checking process and may use the disparity motion vector as the final disparity vector for the current PU.

Figure 5:
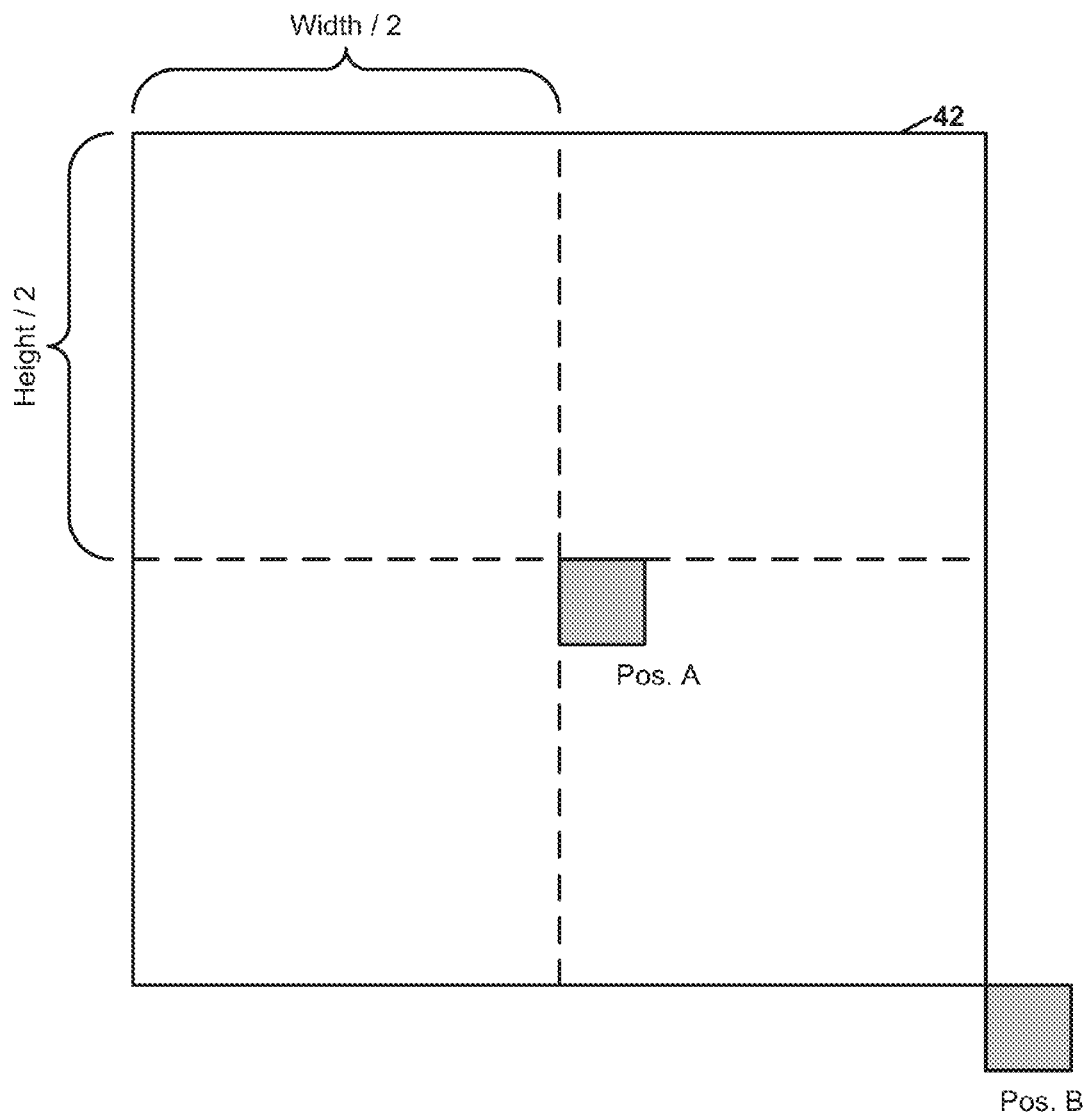
FIG. 5 is a conceptual diagram illustrating temporal neighboring blocks in neighboring-block based disparity vector (NBDV) derivation.

FIG. 5 is a conceptual diagram illustrating temporal neighboring blocks in NBDV derivation. In the example of FIG. 5, a block 42 indicates a co-located region for a current PU. Furthermore, in the example of FIG. 5, the block labeled "Pos. A" corresponds to the center block. The block labeled "Pos. B" corresponds to the bottom-right block. As indicated in the example of FIG. 5, the center block may be located immediately below and to the right of the center of a center point of the co-located region.

When the video coder checks a neighboring PU (i.e., a spatially- or temporally-neighboring PU), the video coder may check first whether the neighboring PU has a disparity motion vector. If the none of the neighboring PUs has a disparity motion vector, the video coder may determine whether any of the spatially-neighboring PUs has an IDV. The video coder may check the spatially-neighboring PUs in the order of $A_0$, $A_1$, $B_0$, $B_1$, and $B_2$. If one of the spatially-neighboring PUs has an IDV and the IDV is coded as merge/skip mode, the video coder may terminate the checking process and may use the IDV as the final disparity vector for the current PU.

In 3D-HEVC, a video coder may generate merge candidate lists and AMVP candidate lists in a manner that differs somewhat from the manner used to generate merge candidate lists and AMVP candidate lists in the base HEVC specification. For example, the video coder may determine, based on a disparity vector for a current PU, an inter-view predicted motion vector candidate (IPMVC). If the IPMVC is available, the video coder may add the IPMVC to a merge candidate list for the current PU or an AMVP candidate list for the current PU. The IPMVC, if available, may specify a temporal motion vector (i.e., a motion vector that indicates a location in a reference picture in the same view as, but different time instance, than the current PU).

In 3D-HEVC, a video coder may generate a merge candidate list for a current PU as follows. Because skip mode may have the same motion vector derivation process as merge mode, techniques described in this document may apply to both merge and skip modes. After deriving the disparity vector for the current PU, the video coder may firstly insert an IPMVC candidate into the merge candidate list. The video coder may derive the IPMVC according to the procedure described elsewhere in this disclosure. Second, the video coder may perform a derivation process for spatial merging candidates and an inter-view disparity motion vector candidate (IDMVC) insertion process. Third, the video coder may perform a derivation process for a temporal merging candidate. In some examples, the derivation process for the temporal merging candidate may be the same as in the HEVC base specification and 3D-HEVC. Fourth, the video coder may perform a derivation process for combined bi-predictive merging candidates. Fifth, the video coder may perform a derivation process for zero motion vector merging candidates. The derivation process for zero motion vector merging candidates may be the same as described in HEVC Working Draft 9.

As indicated above, the video coder may derive an IPMVC for insertion into the merge candidate list. To derive the IPMVC for insertion in the merge candidate list, the video coder may locate, based at least in part on a disparity vector of a current video unit (e.g., a current PU, a current CU, etc.), a reference block of the current video unit. The reference block of the current video unit is in a reference view (i.e., a different view than the current video unit) and in the same access unit as the current video unit. In other words, a reference block of the current PU/CU in a reference view of the same access unit is located by the disparity vector.

Furthermore, to derive the IPMVC for insertion in a merge candidate list, the video coder may determine whether the reference block is intra coded. If the reference block is not intra coded, the reference block may be uni-directionally inter predicted or bi-directionally inter predicted. If the reference block is uni-directionally inter predicted, the reference index of the reference block indicates the reference block's reference picture. The reference block's reference picture is in a particular reference picture list (i.e., RefPicListX, where X is equal to 0 or 1) for the reference block. Furthermore, if the reference block is uni-directionally inter predicted, the video coder may determine whether a POC value of the reference block's reference picture matches a POC value of a reference picture in RefPicListX for the current video block. If the POC value of the reference block's reference picture matches the POC value of a reference picture in RefPicListX for the current video block, the video coder may generate the IPMVC such that a prediction direction indicator (e.g., inter_pred_idc[x0][y0]) of the IPMVC is equal to the prediction direction indicator of the reference block, a motion vector of the IPMVC is equal to a motion vector of the reference block, and a reference index of the IPMVC indicates a position in RefPicListX for the current video block of the reference picture whose POC value matches the POC value of the reference block's reference picture.

If the reference block is bi-directionally inter predicted, the reference block has two reference indexes and two motion vectors. Hence, the reference block has a first reference picture in the reference block's RefPicList0 and a second reference picture in the reference block's RefPicList1. If the POC value of the reference block's first reference picture matches a POC value of a reference picture in the current video unit's RefPicList0 and if the POC value of the reference block's second reference picture matches a POC value of a reference picture in the current video unit's RefPicList1, the video coder may generate the IPMVC for insertion in the merge candidate list such that a prediction direction indicator for the IPMVC matches the prediction direction indicator for the reference block and motion vectors of the IPMVC match motion vectors for the reference block. Furthermore, if this condition is true, a first reference index of the IPMVC indicates a position in the current video unit's RefPicList0 of the reference picture whose POC value matches the POC value of the reference block's first reference picture. In addition, if this condition is true, a second reference index of the IPMVC indicates a position in the current video unit's RefPicList1 of the reference picture whose POC value matches the POC value of the reference block's second reference picture. Thus, if the reference block is not intra-coded and not inter-view predicted and its reference picture RefPicListX[ref_idx_lx] has a POC value equal to that of one entry RefPicListX[RefIdxLx] in the same reference picture list of the current PU/CU, its motion information (e.g., prediction direction, reference pictures, and motion vectors), after converting the reference index based on POC (i.e., RefIdxLx) is derived to be the IPMVC for inclusion in a merge candidate list.

Figure 6:
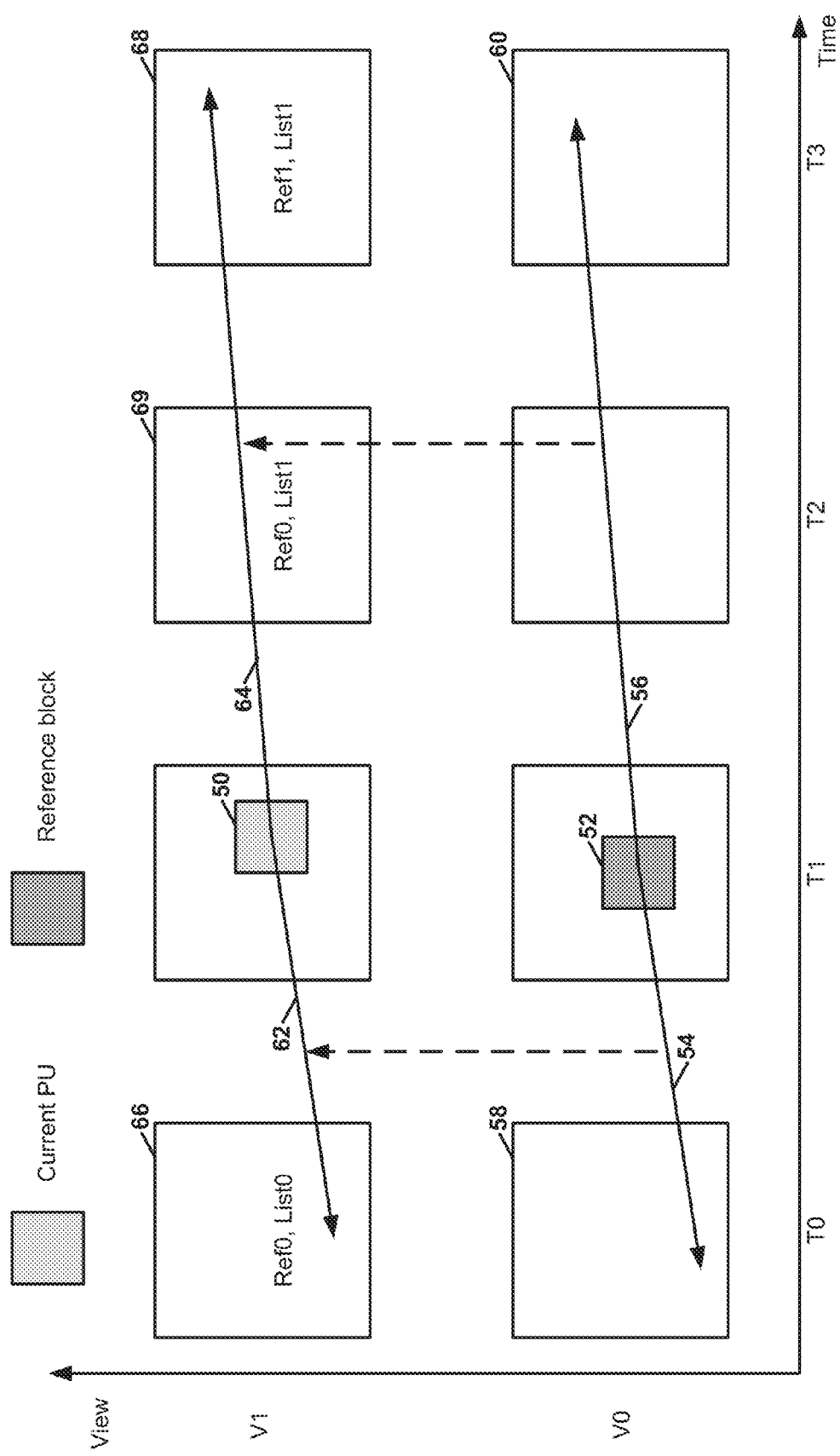
FIG. 6 is a conceptual diagram illustrating an example derivation of an inter-view predicted motion vector prediction candidate (IPMVC) for merge/skip mode.

FIG. 6 is a conceptual diagram illustrating an example derivation of an IPMVC for merge/skip mode. In the example of FIG. 6, a current PU 50 occurs in view V1 at a time instance T1. A reference PU 52 for current PU 50 occurs in a different view than current PU 50 (i.e., view V0) and at the same time instance as current PU (i.e., time instance T1). In the example of FIG. 6, reference PU 52 is bi-directionally inter predicted. Hence, reference PU 52 has a first motion vector 54 and a second motion vector 56. Motion vector 54 indicates a position in a reference picture 58. Reference picture 58 occurs in view V0 and in time instance T0. Motion vector 56 indicates a position in reference picture 60. Reference picture 60 occurs in view V0 and in time instance T3.

The video coder may generate, based on the motion information of reference PU 52, an IPMVC for inclusion in a merge candidate list of current PU 50. The IPMVC may have a first motion vector 62 and a second motion vector 64. Motion vector 62 matches motion vector 54 and motion vector 64 matches motion vector 56. The video coder generates the IPMVC such that a first reference index of the IPMVC indicates a position in RefPicList0 for current PU 50 of a reference picture (i.e., reference picture 66) occurring in the same time instance as reference picture 58 (i.e., time instance T0). In the example of FIG. 6, reference picture 66 occurs in the first position (i.e., Ref0) in RefPicList0 for current PU 50. Furthermore, the video coder generates the IPMVC such that a second reference index of the IPMVC indicates a position in RefPicList1 for current PU 50 of a reference picture (i.e., reference picture 68) occurring in the same time instance as reference picture 60. Thus, in the example of FIG. 6, the RefPicList0 reference index of the IPMVC may be equal to 0. In the example of FIG. 6, a reference picture 69 occurs in the first position (i.e., Ref0) in RefPicList1 for current PU 50 and reference picture 68 occurs in the second position (i.e., Ref1) in RefPicList1 for current PU 50. Thus, the RefPicList1 reference index of the IPMVC may be equal to 1.

In addition to generating the IPMVC and including the IPMVC in the merge candidate list, the video coder may convert the disparity vector for the current PU into an IDMVC and may include the IDMVC in a merge candidate list for the current PU. In other words, the video coder may include, in the merge candidate list for the current PU, a merge candidate that specifies the disparity vector of the current PU. Thus, the IDMVC may indicate a position in a reference picture in a different view than the current PU. The video coder may add the inter-view disparity motion vector to the merge candidate list in a different position than the IPMVC. The term "inter-view candidate" may be used to refer to either an IPMVC or an IDMVC.

If the video coder is able to determine an IPMVC for the current PU, the IPMVC is considered to be available. Thus, if the reference PU for the current PU is intra predicted or a POC value of a reference picture indicated by a reference index of the reference PU does not match the POC value of any reference picture in a corresponding reference picture list for the current PU, the IPMVC for the current PU may be considered to be unavailable. If IPMVC is available, the video coder may insert the IPMVC before all spatial and temporal merging candidates in the merge candidate list for the current PU. The video coder may insert, into the merge candidate list for the current PU, the IDMVC before a spatial merging candidate derived from position $A_0$.

As indicated above, the video coder may perform a derivation process for spatial merging candidates when generating a merge candidate list for a current PU. To perform the derivation process for spatial merging candidates, the video coder may check the motion information of one or more spatially-neighboring PUs. In the derivation process for spatial merging candidates, the video coder may check the motion information of the spatially-neighboring PUs in the following order: $A_1$, $B_1$, $B_0$, $A_0$, $B_2$.

In some examples, the video coder may perform a constrained pruning process with regard to the spatial merging candidates. The video coder may perform the constrained pruning process by performing the following procedures. First, if the motion information for the PU covering $A_1$ is available and is different from the motion information of the IPMVC, the video coder may insert a merge candidate for $A_1$ into the merge candidate list. Second, if the PUs covering $B_1$ and $A_1$ or the IPMVC have the same motion vectors and different reference indices, the video coder does not insert a merge candidate for $B_1$ into the merge candidate list. Otherwise, if the motion information of the PU covering $B_1$ is available, the video coder may insert a merge candidate for $B_1$ into the merge candidate list. Third, if the PUs covering $B_0$ and $B_1$ have the same motion vectors and the same reference indexes, the video coder does not insert a merge candidate for $B_0$ into the merge candidate list. Otherwise, if the motion information for the PU covering $B_0$ is available, the video coder inserts a merge candidate for $B_0$ into the merge candidate list. Fourth, the video coder may derive the IDMVC as described elsewhere in this disclosure. If the IDMVC is available and is different from the merge candidates for $A_1$ and $B_1$, the video coder inserts the IDMVC into the merge candidate list. Fifth, if the PUs covering $A_0$ and $A_1$ have the same motion vectors and the same reference indices, the video coder does not insert a merge candidate for $A_0$ into the merge candidate list. Otherwise, if the motion information for the PU covering $A_0$ is available, the video coder inserts the merge candidate for $A_0$ into the merge candidate list. Sixth, the video coder inserts a merge candidate for $B_2$ into the merge candidate list neither of the following conditions are true: the PUs covering $B_2$ and $B_1$ or $B_2$ and $A_1$ have the same motion vectors and the same reference indexes; and all of the four spatial merging candidates derived from $A_1$, $B_1$, $B_0$, $A_0$ and IVMC are included in the merge candidate list.

Furthermore, as indicated above, the video coder may perform a derivation process for combined bi-predictive merging candidates when generating a merge candidate list. If the total number of candidates derived from the derivation process for spatial merging candidates and the derivation process for temporal merging candidates is less than the maximum number of candidates includable in the AMVP candidate list, the video coder may perform the same process as defined in the base HEVC specification, except the specification of l0CandIdx and l1CandIdx may be different in 3D-HEVC. For instance, the video coder may use the specification of l0CandIdx and l1CandIdx shown in the example of FIG. 7. The relationship among combIdx, l0CandIdx and l1CandIdx are defined in the table shown in FIG. 7. In other words, FIG. 7 is an example table that indicates an example specification of l0CandIdx and l1CandIdx.

For instance, if the number of elements within a merge candidate list ("numOrigMergeCand") is greater than 1 and less than the maximum number of merge candidates ("MaxNumMergeCand") in a merge candidate list, the video coder may set a variable numInputMergeCand to the number of merging candidates ("numMergeCand"), set a variable combIdx to 0, set a variable combStop to "false," and repeat the following steps until combStop is "true":

1. The variables l0CandIdx and l1CandIdx are derived using combIdx as specified in Table 7.
2. The following assignments are made with l0Cand being the candidate at position l0CandIdx and l1Cand being the candidate at position l1CandIdx in the merging candidate list mergeCandList (l0Cand=mergeCandList [l0CandIdx], l1Cand=mergeCandList[l1CandIdx]).
3. When all of the following conditions are true,
   predFlagL0l0Cand==1,
   predFlagL1l1Cand==1,
   DiffPicOrderCnt(RefPicList0[refIdxL0l0Cand], RefPicList1[refIdxL1l1Cand])!=0||
   mvL0l0Cand!=mvL1l1Cand,
   the candidate combCand$_k$ with k equal to (numMergeCand−numInputMergeCand) is added at the end of mergeCandList (mergeCandList[numMergeCand]=combCand$_k$) and the reference indices, the prediction list utilization flags and the motion vectors of combCand$_k$ are derived as follows and numMergeCand is incremented by 1.
   refIdxL0combCand$_k$=refIdxL0l0Cand
   refIdxL1combCand$_k$=refIdxL1l1Cand
   predFlagL0combCand$_k$=1
   predFlagL1combCand$_k$=1
   mvL0combCand$_k$[0]=mvL0l0Cand[0]
   mvL0combCand$_k$[1]=mvL0l0Cand[1]
   mvL1combCand$_k$[0]=mvL1l1Cand[0]
   mvL1combCand$_k$[1]=mvL1l1Cand[1]
   numMergeCand=numMergeCand+1
4. The variable combIdx is incremented by 1.
5. When combIdx is equal to (numOrigMergeCand* (numOrigMergeCand−1)) or numMergeCand is equal to MaxNumMergeCand, combStop is set to TRUE.

In some implementations, a merge candidate list may include up to six merge candidates. In some such implementations, video encoder 20 may include, in a slice header, a syntax element five_minus_num_merge_cand to specify the maximum number of merge candidates subtracted from 6. The value of the five_minus_num_merge_cand syntax element may be in the range of 0 to 5, inclusive.

In 3D-HEVC, when a video coder signals the motion information of a current PU using AMVP mode, the video coder may determine up to three motion vector candidates for the current PU. For a given reference index for the current PU, the video coder may derive two of the three motion vector candidates in the same manner as in base HEVC. In addition, the video coder may derive one IPMVC based on a disparity motion vector for the current PU, similar to how the video coder may derive an IPMVC and an IDMVC in merge mode. In this way, the AMVP mode has been extended in a way that an IPMVC may be added to the AMVP candidate list.

In AMVP mode, if a reference index for the current block indicates an inter-view reference picture, the IPMVC is set equal to the corresponding disparity vector with its vertical component set to 0. If the reference index refers to a temporal reference picture and the reference block uses a motion hypothesis that refers to the same access unit as the current PU's reference index, the motion vector that is associated with this motion hypothesis is used as the IPMVC. The video coder may firstly check RefPicList0 in this manner, followed by RefPicList1. Thus, video decoder 30 may determine whether a RefPicListX reference index signaled, in a bitstream, for a current PU indicates a temporal reference picture. In addition, video decoder 30 may determine, based on a disparity vector for the current PU, a reference PU. Furthermore, if the RefPicListX reference index for the current PU indicates a temporal reference picture (i.e., if the current PU's RefPicListX target reference picture is a temporal reference picture), the video coder may determine whether the reference PU's RefPicList0 target reference picture is available and, if so, whether the reference PU's RefPicList0 target reference picture has the same POC value as the current PU's RefPicListX target reference picture. If the reference PU's RefPicList0 target reference picture is available and has a POC value equal to the POC value of the current PU's RefPicListX target reference picture, video decoder 30 may determine that the IPMVC is equal to the reference PU's RefPicList0 motion vector. If the RefPicList0 motion vector of the reference block does not indicate a temporal reference picture having the same POC value as the current PU's RefPicListX target reference picture, video decoder 30 may determine whether the reference PU's RefPicList1 target reference picture is available and, if so, whether the reference PU's RefPicList1 target reference picture has a POC value that matches the POC value of the current PU's RefPicListX target reference picture. If the reference PU's RefPicList1 target reference picture is available and the reference PU's RefPicList1 target reference picture has the same POC value as the current PU's RefPicListX target reference picture, video decoder 30 may determine that the IPMVC specifies the reference PU's RefPicList1 motion vector.

In all other cases, the video coder may mark the IPMVC as invalid and the video coder may use a zero motion vector candidate. The video coder may insert the zero motion vector candidate into the AMVP candidate list before all other candidates. The video coder may derive the other candidates in manner described above with regard to base HEVC.

Figure 8:
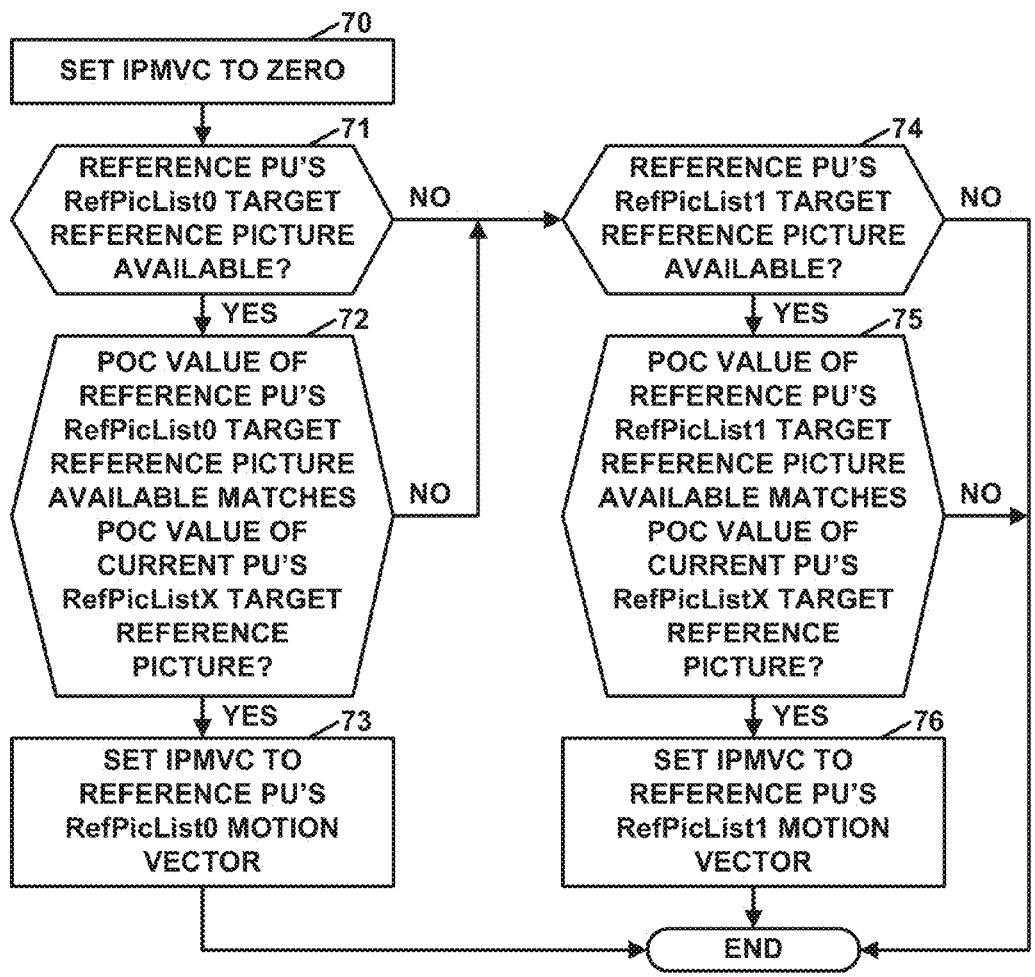
FIG. 8 is a flowchart illustrating an example derivation of an IPMVC for AMVP mode.

FIG. 8 is a flowchart illustrating an example derivation of an IPMVC for AMVP mode. A video coder may perform the operation of FIG. 8 when generating an AMVP candidate list for a RefPicList0 motion vector or a RefPicList1 motion vector of a current PU. In other words, the video coder may perform the operation of FIG. 8 when generating an AMVP candidate list for a RefPicListX motion vector (where X is a reference picture list index equal to 0 or 1) of the current PU.

In the example of FIG. 8, a video coder may first set an IPMVC to a zero motion vector (70). In addition, the video coder may determine whether a reference PU's RefPicList0 target reference picture is available (71). In response to determining that the reference PU's RefPicList0 target reference picture is available ("YES" of 71), the video coder may determine whether a POC value of the reference PU's RefPicList0 target reference picture matches a POC value of the current PU's RefPicListX target reference picture (72). In response to determining that the POC value of the reference PU's RefPicList0 target reference picture matches the POC value of the current PU's RefPicListX target reference picture ("YES" of 72), the video coder may set the IPMVC to the reference PU's RefPicList0 motion vector (73).

Otherwise, in response to determining that the reference PU's RefPicList0 target reference picture is not available ("NO" of 71) or in response to determining that the POC value of the reference PU's RefPicList0 target reference picture does not match the POC value of the current PU's RefPicListX target reference picture ("NO" of 72), the video coder may determine whether the reference PU's RefPicList1 target reference picture is available (74). In response to determining that the reference PU's RefPicList1 target reference picture is available ("YES" of 74), the video coder may determine whether the POC value of the reference PU's RefPicList1 target reference picture matches the POC value of the current PU's RefPicListX target reference picture (75). In response to determining that the POC value of the reference PU's RefPicList1 target reference picture matches the POC value of the current PU's RefPicListX target reference picture ("YES" of 75), the video coder may set the IPMVC to the reference PU's RefPicList1 motion vector (76).

Otherwise, in response to determining that the reference PU's RefPicList1 target reference picture is not available ("NO" of 74) or in response to determining that the POC value of the reference PU's RefPicList1 target reference picture does not match the POC value of the current PU's RefPicListX target reference picture ("NO" of 75), the video coder may end the process of determining the IPMVC without modifying the IPMVC from zero.

In the current design of AMVP in HEVC-based 3DV, the disparity vector derived for a current PU may not be sufficiently accurate. Furthermore, if the reference index of the current PU indicates a temporal reference picture, an IPMVC is available only when the reference block contains a motion vector pointing to the same access unit as that identified by the reference index of the current PU.

For example, if the POC value of a RefPicList0 target reference picture of the reference PU does not match a POC value of a RefPicList0 target reference picture of the current PU, a video coder may determine whether the reference PU's RefPicList1 target reference picture is available and, if so, whether the reference PU's RefPicList1 target reference picture has a POC value that matches the POC value of the current PU's RefPicListX target reference picture. If the video coder determines that the reference PU's RefPicList1 target reference picture is unavailable or that the POC value of the reference PU's RefPicList1 target reference picture does not match the POC value of the current PU's RefPicListX target reference picture, the video coder may determine that the IPMVC is unavailable.

In accordance with one or more techniques of this disclosure, when the motion information of a current PU is signaled in AMVP mode, a video coder (e.g., video encoder 20 or video decoder 30) may determine an IPMVC. The video coder may determine a motion vector of the current PU based on the IPMVC. In the following description, "X" is a reference picture list index equal to 0 or 1 and "Y" is a reference picture list index equal to 1–X. In general, a reference picture list index is an index value used to differentiate the reference picture lists.

When the motion information of a current PU is signaled in AMVP mode, the video coder generates one or more AMVP candidates. The video coder may use the one or more AMVP candidates to determine a RefPicListX motion vector for the current PU. The AMVP candidates may include a RefPicListX IPMVC. In accordance with one or more techniques of this disclosure, the video coder may perform the following derivation process to determine the RefPicListX IPMVC.

If the RefPicListX target reference picture of the reference PU is available (e.g., if the RefPicListX reference index of the reference PU ≥0) and has a POC value that matches a POC value of a RefPicListX target reference picture for the current PU, the video coder may determine an IPMVC based on the RefPicListX motion vector for the reference PU. For instance, the IPMVC may be equal to the reference PU's RefPicListX motion vector. The RefPicListX target reference picture for the current PU is a reference picture identified by a RefPicListX reference index signaled for the current PU. The reference PU's RefPicListX target reference picture is a reference picture identified by the reference PU's RefPicListX reference index. Thus, during the derivation process to derive an IPMVC for AMVP mode, if the reference picture in RefPicListX of the reference picture is available and has the same POC value as that of the target reference picture of the current PU, the corresponding motion vector may be returned as the inter-view candidate.

Otherwise, if the reference PU's RefPicListX target reference picture is not available (e.g., if the reference PU's RefPicListX reference index <0) or the POC value of the reference PU's RefPicListX target reference picture of the reference PU does not match the POC value of the current PU's RefPicListX target reference picture, the video coder may determine whether a RefPicListY target reference picture of the reference PU is available (i.e., whether the reference PU's RefPicListY reference index ≥0) and has a POC value that matches a POC value of the current PU's RefPicListX target reference picture. The reference PU's RefPicListY target reference picture is a reference picture identified by the reference PU's RefPicListY reference index. Thus, the POC value of the reference picture in RefPicListY is checked (wherein X is the target reference picture list and equal to 0 or 1, and Y is equal to 1–X).

If the reference PU's RefPicListY target reference picture is available and has a POC value that matches the POC value of the current PU's RefPicListX target reference picture, the video coder may determine the IPMVC based on the RefPicListY motion vector of the reference PU. For example, the video coder may determine that the IPMVC is equal to the reference PU's RefPicListY motion vector. Otherwise, in some examples, if the reference PU's RefPicListY target reference picture is not available or the POC value of the reference PU's RefPicListY target reference picture does not match the POC value of the current PU's RefPicListX target reference picture, the video coder does not determine the IPMVC based on a motion vector of the reference PU.

This derivation process for IPMVCs in AMVP mode may be aligned with the derivation process used for IPMVCs in merge mode in that pictures in RefPicListX are checked first (where RefPicListX is the target reference picture list for the current PU), followed by a picture in RefPicListY. For instance, the video coder may determine whether a flag indicates that motion information of the current PU is signaled using merge mode or AMVP mode. When the flag indicates that merge mode is used to signal the motion vector for the current PU, when the RefPicListX reference picture for the reference PU is available, and when the POC value of the reference PU's RefPicListX target reference picture matches a POC value of any reference picture in the current PU's version of RefPicListX, the video coder may include, in a merge candidate list, an IPMVC that indicates the reference PU's RefPicListX motion vector. In addition, the video coder may include, in the merge candidate list, an IDMVC that indicates a disparity vector of the reference PU. In examples where the derivation process for IPMVCs in AMVP mode is aligned with the derivation process used for IPMVCs in merge mode, hardware and/or software for generating candidate lists may be shared for AMVP mode and merge mode, thereby potentially reducing implementation complexity and cost.

Furthermore, when the flag indicates that AMVP mode is not used to signal the motion information for the current PU and when the reference PU's RefPicListX target reference picture is not available or when the POC value of the reference PU's RefPicListX target reference picture does not match a POC value of any reference picture in the current PU's version of RefPicListX, the video coder may determine whether the reference PU's RefPicListY target reference picture is available and whether the POC value of the reference PU's RefPicListY target reference picture matches a POC value of any reference picture in the current PU's version of RefPicListX. When the reference PU's RefPicListY target reference picture is available and the POC value of the reference PU's RefPicListY target reference picture matches the POC value of any reference picture in the current PU's version of RefPicListX, the video coder may include, in the merge candidate list, an IPMVC that indicates the reference PU's RefPicListY motion vector. Furthermore, the video coder may generate the IDMVC that indicates the disparity vector of the reference PU.

Thus, in one example where video decoder 30 is determining an IPMVC for the purpose of determining a RefPicList1 motion vector of a current PU, video decoder 30 may determine, based at least in part on a disparity vector of a current PU of a current picture, a reference PU for the current PU. In this example, the reference PU is in a reference picture that is in the same access unit as the current picture and is in a different view than the current picture. Furthermore, in this example, a first reference index for the reference PU indicates a position, within a first reference picture list of the reference PU, of a first target reference picture for the reference PU. In this example, the first reference picture list for the reference PU has a reference picture list index equal to 1 (i.e., the reference PU's RefPicList1).

Furthermore, in this example, when the first target reference picture for the reference PU is available and a POC value of the first target reference picture for the reference PU matches a POC value of a target reference picture for the current PU, video decoder 30 may determine an IPMVC based on a first motion vector of the reference PU. In this example, the first motion vector of the reference PU indicates a spatial displacement between a prediction block of the reference PU and a position within the first target reference picture for the reference PU. A reference index signaled for the current PU indicates a position, within a reference picture list of the current PU, of the target reference picture for the current PU. The reference picture list for the current has a reference picture list index equal to 1 (i.e., the current PU's RefPicList1).

In this example, when the first target reference picture for the reference PU is not available or the first target reference picture for the reference PU does not have a POC value that matches the POC value of the target reference picture for the current PU, the second target reference picture for the reference PU is available, and a POC value of the second target reference picture for the reference PU matches the POC value of the target reference picture for the current PU, video decoder 30 may determine the IPMVC based on a second motion vector of the reference PU. In this example, a second reference index of the reference PU indicates a position, within a second reference picture list of the reference PU, of the second target reference picture for the reference PU. In this example, the second motion vector of the reference PU indicates a spatial displacement between the prediction block of the reference PU and a position within the second target reference picture for the reference PU. In this example, the second reference picture list of the reference PU has a reference picture list index equal to 0 (i.e., the reference PU's RefPicList0). In this example, video decoder 30 may determine, based on the IPMVC, a predictive block for the current PU.

In some examples where video encoder 20 is determining an IPMVC for the purpose of determining a RefPicList1 motion vector of a current PU, video encoder 20 may perform a process to determining an IPMVC similar to that described in the previous example. However, video encoder 20 may include, in a bitstream, data indicating a reference index that indicates a position, within the reference picture list of the current PU, of the target reference picture for the current PU.

In accordance with some example techniques of this disclosure, the video coder may determine, based at least in part on a disparity vector for a current PU, a reference block for the current PU. When the video coder uses motion vectors of the reference block to generate an AMVP candidate for a reference index of the PU that corresponds to a temporal (short-term) reference picture, the video coder may scale the motion vector to generate an available AMVP candidate, even when the motion vector does not point to the same access unit. For instance, regardless of whether the current PU's RefPicListX target reference index and the RefPicListX reference index of the reference PU indicate reference pictures having different POC values, the video coder may generate an available AMVP candidate by scaling a RefPicListX motion vector of the reference PU. The video coder may scale the RefPicListX motion vector of the reference PU based on the POC distance between the indicated reference pictures (i.e., the difference between POC values of the indicated reference pictures).

Another problem with the design of AMVP in 3D-HEVC described in 3D-HTM version 5.0 is that this design of AMVP uses up to three AMVP candidates. This is not aligned with the HEVC base specification, which uses only two AMVP candidates. In accordance with one or more example techniques of this disclosure, an IPMVC, together with a TMVP and potentially two spatial AMVP candidates are used to derive two final AMVP candidates. In this way, the techniques of this disclosure may align 3D-HEVC with the HEVC base specification. In some examples, a video coder generates a TMVP only when no IPMVC is available. In other words, a video coder may include, in the candidate list, a TMVP candidate only when an IPMVC is unavailable. In this example, the video coder may use the TMVP candidate or the IPMVC in the same way as the video coder may use the TMVP candidate in the AMVP process of HEVC. In another example, the video coder may generate an IPMVC only when no TMVP candidate is available. In other words, the video coder may determine the IPMVC based on a motion vector of the reference PU only when a TMVP candidate is unavailable. In this example, the video coder may use the TMVP candidate or the IPMVC in the same way as the TMVP candidate is used in the AMVP process of HEVC.

As indicated above, an AMVP candidate derived from PUs covering locations $A_0$ and $A_1$ may be denoted as mvLXA. An AMVP candidate derived from PUs covering locations $B_0$, $B_1$, and $B_2$ may be denoted as mvLXB. In one or more example techniques of this disclosure, when a candidate mvLXA and/or mvLXB is unavailable and the target reference index of the current PU corresponds to a temporal (short-term) reference picture, a reference block of $A_0$ and/or $B_0$ may be located with the disparity vector of the current PU and the motion vectors of the reference block may be used to derive a motion vector candidate to substitute for mvLXA and/or mvLXB. In other words, when mvLXA and/or mvLXB is unavailable and the RefPicListX target reference picture of the current PU is a short-term temporal reference picture, the video coder may determine, based on a disparity vector of the current PU, a reference PU for mvLXA and/or a reference PU for mvLXB. The reference PU for mvLXA may be left of the current PU's reference PU. The reference PU for mvLXB may be above the current PU's reference PU. In this example, the video coder may determine a substitute AMVP candidate for mvLXA and/or a substitute AMVP candidate for mvLXB. The video coder may determine the substitute AMVP candidate for mvLXA based on a motion vector of the reference PU for mvLXA. The video coder may determine the substitute AMVP candidate for mvLXB based on a motion vector of the reference PU for mxLXB.

In one alternative example, the video coder may locate reference blocks of $A_0$ and $A_1$. The video coder may use a disparity vector of the current PU to locate the reference blocks for $A_0$ and $A_1$. In this example, the video coder may derive a substitute AMVP candidate for mvLXA using a process similar to the process used in HEVC Working Draft 9 for deriving mvLXA. However, in this example, the video coder may derive the substitute AMVP candidate for mvLXA using the motion vectors of the reference blocks for $A_0$ and $A_1$ instead of the motion vectors in $A_0$ and $A_1$. In other words, reference blocks of $A_0$ and $A_1$ may be located, and their motion vectors are used to substitute motion vectors in $A_0$ and $A_1$ to derive the mvLXA, e.g., in a way similar to HEVC AMVP.

In another alternative example, the video coder may locate reference blocks of $B_0$, $B_1$ and $B_2$. The video coder may use a disparity vector of the current PU to locate the reference blocks for $B_0$, $B_1$, and $B_2$. In this example, the video coder may derive a substitute AMVP candidate for mvLXB using a process similar to the process used in HEVC Working Draft 9 for deriving mvLXB. However, in this example, the video coder may derive the substitute AMVP candidate for mvLB using motion vectors of the reference blocks of $B_0$, $B_1$, and $B_2$ instead of the motion vectors for $B_0$, $B_1$, and $B_2$. In other words, reference blocks of $B_0$, $B_1$ and $B_2$ may be located, and their motion vectors are used to substitute motion vectors in $B_0$, $B_1$, and $B_2$ to derive the mvLXB, e.g., in a way similar to AMVP in base HEVC.

In another alternative example, when mvLXA and/or mvLXB are unavailable, the video coder may use some or all of the five blocks that spatially neighbor a reference block of the current PU to derive an AMVP candidate to include in the AMVP candidate list in place of mvLXA and/or mvLXB. In other words, a certain subset or all of the five neighboring blocks (below-left, left, above-right, above and above-left) of the reference block of current PU may be used to derive an AMVP candidate when mvLXA and/or mvLXB is unavailable.

Some or all of the example techniques of this disclosure may be extended to scalable video coding, with inter-view predicted motion vector being replaced by the motion vector derived from the base layer.

Figure 9:
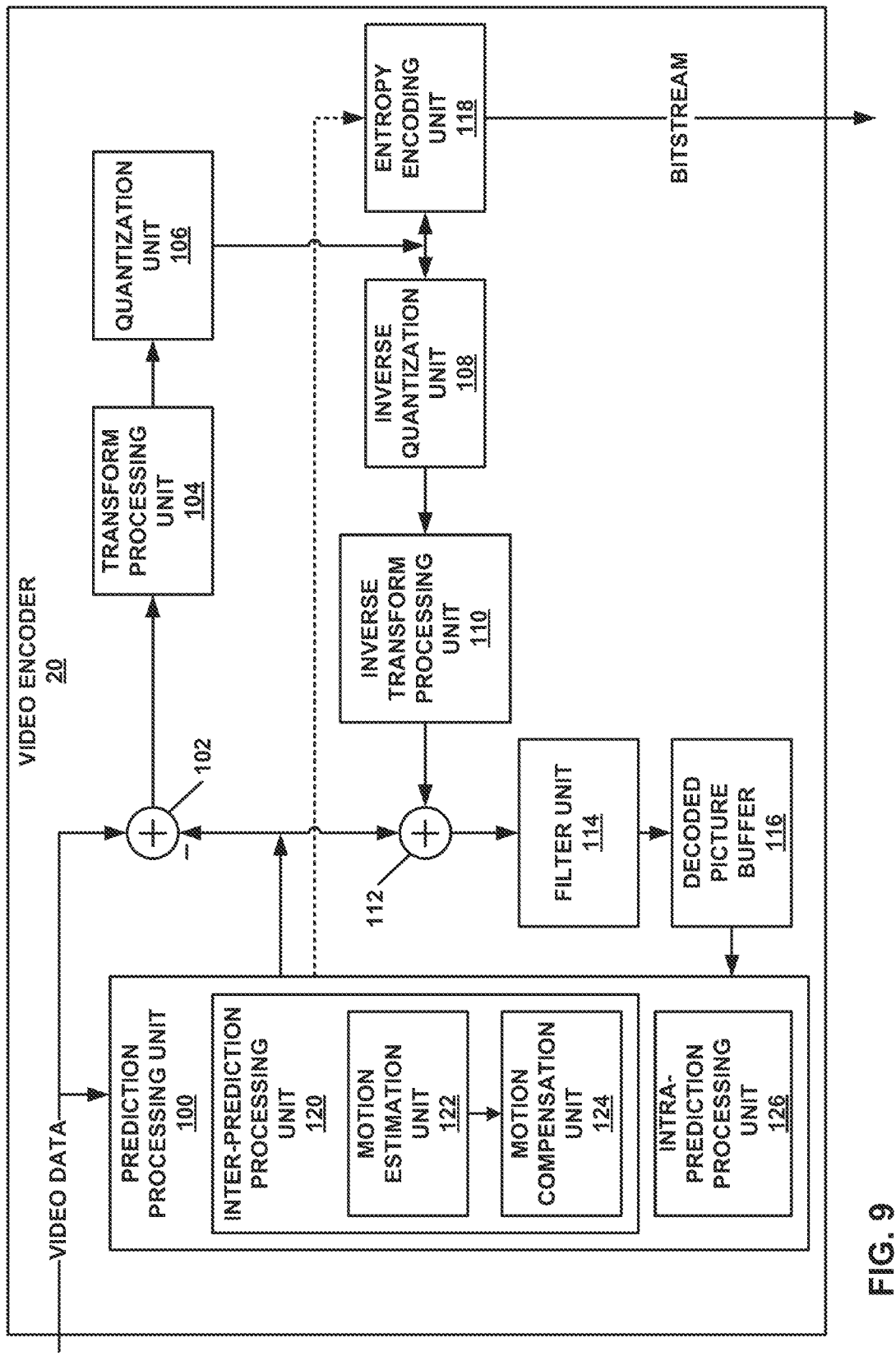
FIG. 9 is a block diagram illustrating an example video encoder that may implement the techniques described in this disclosure.

FIG. 9 is a block diagram illustrating an example video encoder 20 that may implement the techniques of this disclosure. FIG. 9 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 9, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

PUs in a P slice may be intra predicted or uni-directionally inter predicted. For instance, if a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

PUs in a B slice may be intra predicted, uni-directionally inter predicted, or bi-directionally inter predicted. Hence, if a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may determine, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

To signal the RefPicListX motion information of the current PU using AMVP mode, inter-prediction processing unit 120 may generate one or more AMVP candidates. The one or more AMVP candidates may include an IPMVC. Inter-prediction processing unit 120 may perform an IPMVC derivation process to determine the IPMVC. In the IPMVC derivation process, inter-prediction processing unit 120 may determine, based at least in part on a disparity vector of the current PU, a disparity reference PU for the current PU. For example, the disparity vector for the current PU may indicate a spatial displacement between a point in a prediction block for the current PU and a point in a reference picture. Thus, the current PU's disparity vector indicates the point in the reference picture. The disparity reference PU is a PU that covers the point in the reference picture indicated by the current PU's disparity vector. The disparity reference PU and the current PU are in different views of a current access unit. When a RefPicListX target reference picture for the disparity reference PU is available and the RefPicListX target reference picture for the disparity reference PU and a RefPicListX target reference picture for the current PU are in the same access unit, inter-prediction processing unit 120 may determine the IPMVC based on a RefPicListX motion vector of the disparity reference PU. In some examples, inter-prediction processing unit 120 determines the RefPicListX target reference picture for the current PU by searching reference pictures in the current PU's RefPicListX for a region that corresponds to the prediction block of the current PU.

In accordance with one or more techniques of this disclosure, when the RefPicListX target reference picture for the disparity reference PU is not available or the RefPicListX target reference picture for the disparity reference PU is not in the same access unit as the RefPicListX target reference picture of the current PU, the RefPicListY target reference picture for the disparity reference PU is available, and the RefPicListY target reference picture for the disparity reference PU is in the same access unit as the RefPicListX target reference picture of the current PU, inter-prediction processing unit 120 may determine the IPMVC based on a RefPicListY motion vector of the disparity reference PU.

After inter-prediction processing unit 120 generates the AMVP candidate list, motion estimation unit 122 may determine a RefPicListX MVD for the current PU. The RefPicListX MVD may indicate the difference between a motion vector specified by a selected AMVP candidate among the one or more AMVP candidates and a RefPicListX motion vector of the current PU. Inter-prediction processing unit 120 may determine the RefPicListX motion vector for the current PU by searching reference pictures in the current PU's RefPicListX for a region that corresponds to the prediction block of the current PU. Inter-prediction processing unit 120 may select an AMVP candidate from among the one or more AMVP candidates based on a rate/distortion analysis. The bitstream generated by video encoder 20 may include data that indicate the RefPicListX MVD, data that indicate a RefPicListX MVP indicator that indicates the selected AMVP candidate, and a RefPicListX reference index that indicates a reference picture for the current PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. That is, intra-prediction processing unit 126 may determine a predictive block for the PU based on sets of samples in blocks that spatially neighbor the PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding blocks of a CU and the selected predictive luma, Cb and Cr blocks of the PUs of the CU, a luma, Cb, and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In HEVC coding, CABAC is ordinarily be used for entropy coding, with other coding techniques, such as Golomb, Golomb-Rice or exponential Golomb coding, being used for bypass coding, i.e., coding that bypasses the CABAC engine. Video encoder 20 may output a bitstream that includes entropy-encoded data generated by entropy encoding unit 118. The bitstream may also include syntax elements that are not entropy encoded.

Figure 10:
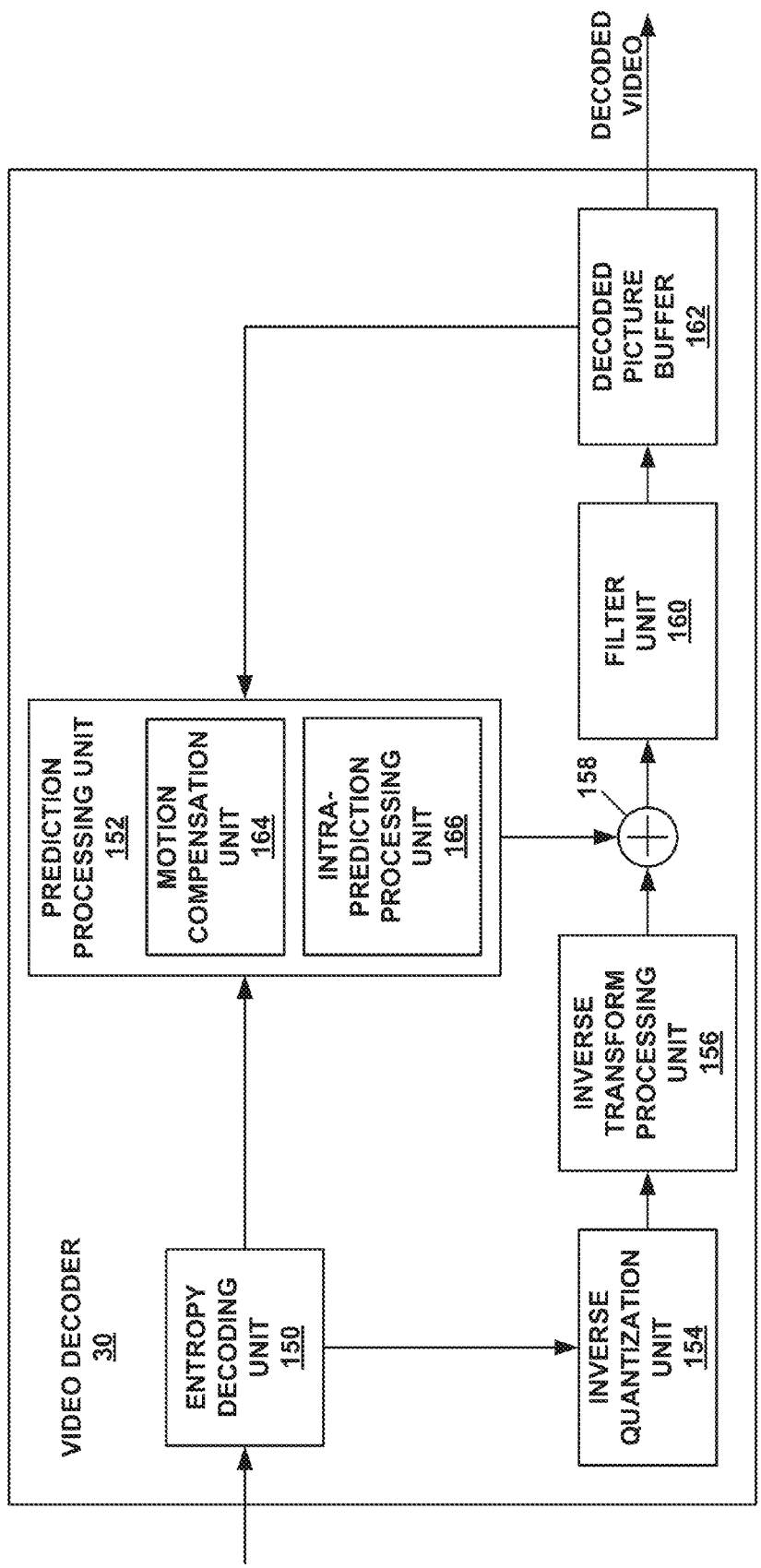
FIG. 10 is a block diagram illustrating an example video decoder that may implement the techniques described in this disclosure.

FIG. 10 is a block diagram illustrating an example video decoder 30 that may implement the techniques described in this disclosure. FIG. 10 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 10, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units of a bitstream and parse the NAL units to obtain syntax elements from the bitstream. Entropy decoding unit 150 may entropy decode entropy-encoded syntax elements in the NAL units using entropy coding techniques such as those described above with reference to entropy encoding unit 118 of FIG. 9. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to obtaining syntax elements from the bitstream, video decoder 30 may perform reconstruction operations on CUs. To perform the reconstruction operation on a CU, video decoder 30 may perform a reconstruction operation on each TU of the CU. By performing the reconstruction operation on each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block associated with a TU, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate one or more predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements obtained from the bitstream. Furthermore, if a PU is encoded using inter prediction, entropy decoding unit 150 may extract motion information for the PU. Motion compensation unit 164 may determine, based on the motion information of the PU, one or more reference blocks for the PU. Motion compensation unit 164 may generate, based on the one or more reference blocks for the PU, predictive luma, Cb, and Cr blocks for the PU.

Reconstruction unit 158 may use the luma, Cb, and Cr transform blocks of TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with one or more techniques of this disclosure, a current PU may have a reference index equal to ref_idx_lX (with X being equal to 0 or 1). ref_idx_lX may correspond to RefPicListX (i.e., RefPicList0 or RefPicList1, depending on the value of X). If RefPicListX[ref_idx_lX] (i.e., the RefPicListX target reference picture for the current PU) is an inter-view reference picture, a video coder (e.g., video encoder 20 or video decoder 30) may include an IDMVC in an AMVP candidate list. The IDMVC may specify a disparity vector of the current PU. In some examples, a vertical component of the IDMVC is set to 0.

Otherwise, if RefPicListX[ref_idx_lX] is not an inter-view reference picture (i.e., the RefPicListX target reference picture of the current PU is a temporal reference picture), the video coder may first locate a reference block identified by a disparity vector of the current PU. The reference indices and motion vectors of the reference block may be denoted as RefIdxVLX, mvVLX, RefIdxVLY, and mvVLY, respectively. The reference picture lists associated with the reference block may be denoted as RefPicListV0 and RefPicListV1 RefPicListVX[RefIdxVLX] denotes a reference picture in the reference PU's RefPicListX at a position indicated by the reference PU's RefPicListX reference index. RefPicListVY[RefIdxVLY] denotes a reference picture in the reference PU's RefPicListY at a position indicated by the reference PU's RefPicListY reference index.

Next, if RefIdxVLX is available (i.e., RefIdxVLX≥0) and RefIdxVX[RefIdxVLX] has the same POC value as RefPicListX[ref_idx_lX], the video coder may set the AMVP candidate to mvVLX. Otherwise, if RefIdxVLY is available and RefPicListVY[RefIdxVLY] has the same POC value as RefPicListX[ref_idx_lx], the video coder may set the AMVP candidate to mvVLY. Otherwise, if RefIdxVLX is available, and RefPicListVX[RefIdxVLX] and RefPicListX[ref_idx_lX] are both short-term pictures, the video coder may further scale mvVLX based on POC distance and the video coder may add the scaled mvVLX to the AMVP candidate list. Otherwise, if RefIdxVLY is available, and RefPicListY[RefIdxVLY] and RefPicListX[ref_idx_lX] are both short-term pictures, the video coder may further scale mvVLY based on POC distance and the video coder may add mvVLY to the AMVP candidate list. Otherwise, the video coder does not derive the AMVP candidate from the current block position. In some examples, the video coder may add a zero motion vector candidate to the AMVP candidate list if the above-mentioned AMVP candidate is unavailable.

Hence, in this example, when a first target reference picture for a reference PU (e.g., the reference picture indicated by RefIdxVLX) is available, and the first target reference picture for the reference PU and the target reference picture for the current PU (e.g., RefPicListX[ref_idx_lX]) both belong to a picture type (e.g., short-term pictures), the video coder may scale a first motion vector of the reference PU (e.g., mvVLX) based on a POC distance (e.g., a POC distance between the first target reference picture for the reference PU and the target reference picture for the current PU). In this example, the video coder may include, in the candidate list, the scaled first motion vector of the reference PU. Furthermore, when the second target reference picture for the reference PU (e.g., the reference picture indicated by RefIdxVLY) is available, and a second target reference picture for the reference PU (e.g., RefPicListVY[RefIdxVLY] and the target reference picture for the current PU (e.g., RefPicListX[ref_idx_lX] are both short-term pictures, the video coder may scale a second motion vector of the reference PU (e.g., mvVLY) based on a POC distance (e.g., a POC distance between the second target reference picture for the reference PU and the target reference picture for the current PU). The video coder may include, in the candidate list, the scaled second motion vector of the reference PU. Furthermore, in this example, when the second target reference picture for the reference PU (e.g., the reference picture indicated by RefIdxVLY) is not available, the video coder may include a zero motion vector in the candidate list.

In another example, if RefPicListX[ref_idx_lX] is not an inter-view reference picture, the video coder may first locate a reference block identified by a disparity vector of the current PU. As before, the reference indices and motion vectors of the reference block may be denoted as RefIdxVLX, mvVLX, RefIdxVLY, and mvVLY, respectively. The reference picture lists associated with the reference block may be denoted as RefPicListV0 and RefPicListV1. In this example, if RefIdxVL0 is available (i.e., RefIdxVL0≥0) and RefPicListV0[RefIdxVL0] has the same POC value as RefPicListX[ref_idx_lx], the video coder may set the AMVP candidate to mvVL0 (i.e., the RefPicList0 motion vector of the reference PU). Otherwise, if RefIdxVL1 is available and RefPicListV1 [RefIdxVL1] has the same POC value as RefPicListX[ref_idx_lx], the video coder may set the AMVP candidate to mvVL1 (i.e., the RefPicList1 motion vector of the reference PU). Otherwise, if RefIdxVL0 is available, and RefPicListV0[RefIdxVL0] and RefPicListX[ref_idx_lX] are both short-term pictures, the video coder may further scale mvVL0 based on POC distance and the video coder may add the scaled mvVL0 to the AMVP candidate list. Otherwise, if RefIdxVL1 is available, and RefPicList1 [RefIdxVL1] and RefPicListX[ref_idx_lX] are both short-term pictures, the video coder may scale mvVL1 based on POC distance and the video coder may add the scaled mvVL1 to the AMVP candidate list.

In another example, if RefPicListX[ref_idx_lX] is not an inter-view reference picture, the video coder may first locate a reference block identified by a disparity vector of the current PU. As before, the reference indices and motion vectors of the reference block may be denoted as RefIdxVLX, mvVLX, RefIdxVLY, and mvVLY, respectively. The reference picture lists associated with the reference block may be denoted as RefPicListV0 and RefPicListV1. In this example, if RefIdxVLX is available (i.e., RefIdxVLX≥0) and RefPicListVX[RefIdxVLX] has the same POC value as RefPicListX[ref_idx_lX], the video coder may set the AMVP candidate to mvVLX. Otherwise, if RefIdxVLX is available, and RefPicListVX[RefIdxVLX] and RefPicListX[ref_idx_lX] are both short-term pictures, the video coder may further scale mvVLX based on POC distance and the video coder may add the scaled mvVLX to the AMVP candidate list. Otherwise, if RefIdxVLY is available and RefPicListVY[RefIdxVLY] has the same POC value as RefPicListX[ref_idx_lx], the video coder may set the motion vector candidate to mvVLY. Otherwise, if RefIdxVLY is available, and RefPicListY[RefIdxVLY] and RefPicListX[ref_idx_lX] are both short-term pictures, the video coder may further scale mvVLY based on POC distance and the video coder may add the scaled mvVLY to the AMVP candidate list.

Thus, in this example, when a first target reference picture for the reference PU (e.g., the picture indicated by RefIdxVLX) is available, the first target reference picture for the reference PU does not have the same POC value as the target reference picture for the current PU (e.g., RefPicListX[ref_idx_lX]), and both the first target reference picture for the reference PU and the target reference picture for the current PU belong to a picture type (e.g., short term pictures), the video coder may scale a first motion vector for the reference PU (e.g., mvVLX) based on a POC distance (e.g., the POC distance between the first target reference picture for the reference PU and the target reference picture for the current PU). The video coder may determine an IPMVC such that the IPMVC specifies the scaled first motion vector for the reference PU.

Furthermore, in this example, when the first target reference picture for the reference PU is not available, the first target reference picture for the reference PU does not have the same POC value as the target reference picture for the current PU, or the first target reference picture for the reference PU and the target reference picture for the current PU do not both belong to the picture type, and the second target reference picture for the reference PU (e.g., the reference picture indicated by RefIdxVLY) is available, and the second target reference picture for the reference PU and the target reference picture for the current PU have the same POC value, the video coder may determine the IPMVC such that the IPMVC specifies mvVLY.

In this example, when the first target reference picture for the reference PU is not available, the first target reference picture for the reference PU does not have the same POC value as the target reference picture for the current PU, the first target reference picture for the reference PU and the target reference picture for the current PU do not both belong to the picture type, the second target reference picture for the reference PU is available, the second target reference picture for the reference PU and the target reference picture for the current PU do not have the same POC value, and the second target reference picture for the reference PU and the target reference picture for the current PU both belong to the picture type, the video coder may scale the second motion vector for the reference PU based on a POC distance (e.g., the POC distance between the second target reference picture for the reference PU and the target reference picture for the current PU). The video coder may determine the IPMVC such that the IPMVC indicates the scaled first motion vector for the reference PU.

In another example, if RefPicListX[ref_idx_lX] is not an inter-view reference picture, the video coder may first locate a reference block identified by a disparity vector of the current PU. As before, the reference indices and motion vectors of the reference block may be denoted as RefIdxVLX, mvVLX, RefIdxVLY, and mvVLY, respectively. The reference picture lists associated with the reference block may be denoted as RefPicListV0 and RefPicListV1. In this example, if RefIdxVL0 is available (i.e., RefIdxVL0≥0) and RefPicListV0[RefIdxVL0] has the same POC value as RefPicListX[ref_idx_lx], the video coder may set the AMVP candidate to mvVL0. Otherwise, if RefIdxL0 is available, and RefPicListV0[RefIdxVL0] and RefPicListX[ref_idx_lX] are both short-term pictures, the video coder may further scale mvVL0 based on POC distance and the video coder may add the scaled mvLV0 to the AMVP candidate list. Otherwise, if RefIdxVL1 is available and RefPicListV1[RefIdxVL1] has the same POC value as RefPicListX[ref_idx_lx], the video coder may set the AMVP candidate to mvVL1. Otherwise, if RefIdxVL1 is available, and RefPicListV1[RefIdxVL1] and RefPicListX[ref_idx_lX] are both short-term pictures, the video coder may further scale mvVL1 based on POC distance and the video coder may add the scaled mvVL1 to the AMVP candidate list.

Alternatively, in one or more of the examples provided above, "short-term pictures" are replaced by "inter prediction reference pictures" and "long-term pictures" are replaced by "inter-view prediction reference pictures."

Some example techniques of this disclosure provide for a unification of the inter-view candidate derivation process for merge mode and AMVP mode. In some such examples, a decoding process described in 3D-HEVC Test Model 2 for inter-view candidates may be modified as follows. In the following text, italicized text in double square brackets (e.g., [[text]]) are portions proposed to be removed from 3D-HEVC Test Model 2 in accordance with examples of this disclosure and underlined text indicates text proposed to be inserted into 3D-HEVC Test Model 2 in accordance with examples of this disclosure.

G.8.5.2.1.10 Derivation process for the inter-view motion vector predictor candidate This process is not invoked when multi_view_mv_pred_flag is equal to 0.

Inputs to this process are:
. . .

Outputs of this process are:
. . .

Let refPicViewIdx be the variable ViewIdx of the RefPicListLX[refIdxLX].

Depending on the value of refPicViewIdx, the following applies:
If refPicViewIdx is not equal to ViewIdx, the derivation process for a disparity inter-view motion vector predictor candidate as specified in subclause G.8.5.2.1.17 [[G.8.5.2.1.11]] is invoked with the luma location (xP, yP), the variables nPSW and nPSH, bMRG flag equal to 0 as the inputs and the outputs are the flag availableFlagLXInterView and the motion vector candidate mvLXInterView.

Otherwise (refPicViewIdx is equal to ViewIdx), the derivation process for a temporal inter-view motion vector candidate as specified in subclause G.8.5.2.1.15 [[G.8.5.2.1.12]] is invoked with the luma location (xP, yP), the variables nPSW and nPSH, the reference index refIdxLX, and the reference view identifier refViewIdx, bMRG flag equal to 0 as the inputs and the outputs are the flag availableFlagLXInterView and the motion vector candidate mvLXInterView.

G.8.5.2.1.15 Derivation process for a temporal inter-view motion vector [[merging]] candidate for AMVP and Merge This process is not invoked when multi_view_mv_pred_flag is equal to 0.

Inputs to this process are:
 a luma location (xP, yP) of the top-left luma sample of the current prediction unit relative to the top-left luma sample of the current picture,
 variables nPSW and nPSH specifying the width and the height, respectively, of the current prediction unit,
 a prediction list indication X.
 a flag bMRG specifying whether current mode is merge, when not presented, it is inferred to be 1.
 a reference index refIdxLX specifying a reference picture in the reference picture list RefPicListLX, when not presented, it is inferred to be 0.

Outputs of this process are:
. . .

The derivation process for a disparity vector as specified in subclause G.5.2.1.13 is invoked with the luma location (xP, yP), and the variables nPSW and nPSH, as the inputs and a flag availableDV and a disparity vector mvDisp and as the outputs.

The reference layer luma location (xRef, yRef) is derived by $$xRef=Clip3(0,PicWidthInSamples_L-1,xP+ ((nPSW-1)>>1)+((mvDisp[0]+2)>>2)) \quad (G-104)$$

$$yRef=Clip3(0,PicHeightInSamples_L-1,yP+ ((nPSH-1)>>1)+((mvDisp[1]+2)>>2)) \quad (G-105)$$

Let refCU be the coding unit that covers the luma location (xRef, yRef) in the view component with ViewIdx equal to refViewIdx.

The flag availableFlagLXInterView is set equal to 0.

When the variable PredMode for the coding unit refCU is equal to MODE_SKIP or MODE_INTER, the following ordered steps apply:
1. Let refPredFlagLY, with Y being replaced by 0 and 1, be the variables predFlagLY for the prediction unit refPU. Let refRefIdxLY, with Y being replaced by 0 and 1, be the variables refIdxLY for the prediction unit refPU. Let refMvLY, with Y being replaced by 0 and 1, be the variables mvLY for the prediction unit refPU. Let refRefPicListLY, with Y being replaced by 0 and 1, be the reference picture list RefPicListLY for the prediction unit refPU in the view component with ViewIdx equal to refViewIdx.
2. When refPredFlagLX is equal to 1, the following apply for each i from (bMRG?0:refIdxLX) to (bMRG?num_ref_idx_lX_active_minus1:refIdxLX), inclusive When availableFlagLXInterView is 0, and the picture order count of the picture refRefPicListLX[refRefIdxLX] is equal to the picture order count of the picture RefPicListLX[i], the flag availableFlagLXInterView is set equal to 1 and the following applies.

mvLXInterView[0]=refMvLX[0]  (G-106)

mvLXInterView[1]=refMvLX[1]  (G-107)

refIdxLX=*i*  (G-108)

if bMRG is equal to 1, the following apply:

IvpMvFlagLX[*xP,yP*]=1  (G-109)

IvpMvDispLX[*xP,yP*]=mvDisp[0]  (G-110)

3. When refPredFlagLY is equal to 1 (with Y equal to 1−X), the following apply for each i from (bMRG?0 refIdxLX) to (bMRG?num_ref_idx_lX_active_minus1: refIdxLX), inclusive, When availableFlagLXInterView is 0, and the picture order count of the picture refRefPicListLY[refRefIdxLY] is equal to the picture order count of the picture RefPicListLX[i], the flag availableFlagLXInterView is set equal to 1 and the following applies.

mvLXInterView[0]=refMvLY[0]  (G-111)

mvLXInterView[1]=refMvLY[1]  (G-112)

if bMRG is equal to 1, the following apply:

refIdxLX=*i*  (G-113)

IvpMvFlagLX[*xP,yP*]=1  (G-114)

IvpMvDispLX[*xP,yP*]=mvDisp[0]  (G-115)

G.8.5.2.1.17 Derivation process for a disparity inter-view motion vector [[merging]] candidate for AMVP and merge
This process is not invoked when multi_view_mv_pred_flag is equal to 0.
Inputs to this process are:
  a luma location (xP, yP) of the top-left luma sample of the current prediction unit relative to the top-left luma sample of the current picture,
. . .
  a flag bMRG specifying whether current mode is merge, when not presented, it is inferred to be 1.
Outputs of this process are:
. . .
The flag availableFlagLXInterView is set equal to 0.
The following apply for each i from (bMRG?0:refIdxLX) to (bMRG?num_ref_idx_lX_active_minus1:refIdxLX), inclusive
  When PicOrderCntVal of the picture RefPicListX[i] is equal to the PicOrderCntVal or the current picture and availableFlagLXInterView is equal to 0 the availableFlagLXInterView is set equal to 1 and the following ordered steps apply.
  1. The motion vector mvLXInterView and the reference index RefPicListLX are derived by mvLXInterView[0]=mvDisp[0]  (G-120)

mvLXInterView[1]=0  (G-121)

refIdxLX=*i*

[[G.8.5.2.1.11 Derivation process for a disparity inter-view motion vector predictor candidate
This process is not invoked when multi_view_mv_pred_flag is equal to 0.
Inputs to this process are:
  a luma location (xP, yP) of the top-left luma sample of the current prediction unit relative to the top-left luma sample of the current picture,
  variables nPSW and nPSH specifying the width and the height, respectively, of the current prediction unit,
Outputs of this process are:
  a flag availableFlagLXInterView specifying whether the inter-view motion vector candidate is available,
  a motion vector candidate mvLXInterView.
The derivation process for a disparity vector as specified in subclause G.8.5.2.1.13 is invoked with the luma location (xP, yP), the variables nPSW and nPSH, as the inputs and a flag availableDV and a disparity vector mvDisp as the outputs.
The flag availableFlagLXInterView is set equal to 1 and the motion vector candidate mvLXInterView is derived by mvLXnterView[0]=mvDisp[0]  (G-83)

mvLXInterView[1]=0  (G-84)]]

[[G.8.5.2.1.12 Derivation process for a temporal inter-view motion vector predictor candidate
This process is not invoked when multi_view_mv_pred_flag is equal to 0.
Inputs to this process are:
  a luma location (xP, yP) of the top-left luma sample of the current prediction unit relative to the top-left luma sample of the current picture,
  variables nPSW and nPSH specifying the width and the height, respectively, of the current prediction unit,
  a reference index refIdxLX (with X being equal to 0 or 1) specifying a reference picture in the reference picture list RefPicListLX,
  a view identifier refViewIdx specifying a reference view.
Outputs of this process are:
  a flag availableFlagLXInterView specifying whether the inter-view motion vector candidate is available,
  a motion vector candidate mvLXInterView (if availableFlagLXInterView is equal to 1).
The derivation process as specified in subclause G.8.5.2.1.13 is invoked with the luma location (xP, yP), and the variables nPSW, nPSH, as the inputs and a flag availableDV and a disparity vector mvDisp as the outputs.
The reference layer luma location (xRef, yRef) is derived by $xRef = \text{Clip3}(0, \text{PicWidthInSamples}_L - 1, xP + ((nPSW-1) >> 1) + ((mvDisp[0]+2) >> 2))$  (G-85)

$yRef = \text{Clip3}(0, \text{PicHeightInSamples}_L - 1, yP + ((nPSH-1) >> 1) + ((mvDisp[1]+2) >> 2))$  (G-86)

Let refCU be the coding unit that covers the luma location (xRef yRef) in the view component with ViewIdx equal to refViewIdx.
The flag availableFlagLXInterView is set equal to 0.
When the variable PredMode for the coding unit refCU is equal to MODE_SKIP or MODE_INTER, the following ordered steps are specified:
  1. Let refPredFlagLY, with Y being replaced by 0 and 1, be the variables predFlagLY for the prediction unit refPU. Let refRefIdxLY with Y being replaced by 0 and 1, be the variables refIdxLY for the prediction unit refPU. Let refMvLY, with Y being replaced by 0 and 1, be the variables mvLY for the prediction unit refPU Let refRefPicListLY, with Y being replaced by 0 and 1, be the reference picture list RefPicListLY for the prediction unit refPU in the view component with ViewIdx equal to refViewIdx.

2. When refPredFlagL0 is equal to 1 and the picture order count of the picture refRefPicListL0[refRefIdxL0] is equal to the picture order count of the picture RefPicListLX[refIdxLX], the flag availableFlagLXInterView is set equal to 1 and the motion vector mvLXInterView is derived by $$mvLXInterView[0]=refMvL0[0] \quad (G\text{-}87)$$

$$mvLXInterView[1]=refMvL0[1] \quad (G\text{-}88)$$

3. When availableFlagLXInterView is equal to 0 and refPredFlagL1 is equal to 1 and the picture order count of the picture refRefPicListL1[refRefIdxL1] is equal to the picture order count of the picture RefPicListLY[refIdxLX], the flag availableFlagLXInterView is set equal to 1 and the motion vector mvLXInterView is derived by $$mvLXInterView[0]=refMvL1[0] \quad (G\text{-}89)$$

$$mvLXInterView[1]=refMvL1[1] \quad (G\text{-}90)]]$$

As shown in lines G-106 and G-107 above, when a current motion vector prediction mode for the current PU is merge mode (e.g., when bMRG is equal to 1), and the POC value of the first target reference picture for the reference PU is equal to a POC value of any reference picture in the first reference picture list of the current PU, the video coder may determine the IPMVC (i.e., mxLXInterView) based on refMvLX. As shown in line G-110 above, when the current motion vector prediction mode for the current PU is merge mode, the video coder may determine an IDMVC based on a disparity vector (e.g., mvDisp[0]) of the reference PU. Furthermore, as shown in lines G-106 and G-107, when the current motion vector prediction mode for the current PU is AMVP mode and the POC value of the first target reference picture for the reference PU is equal to the POC value of the target reference picture for the current PU, the video coder may determine the IPMVC based on refMxLX.

Moreover, as shown in lines G-111 and G-112 above, when the current motion vector prediction mode for the current PU is merge mode (e.g., bMRG is equal to 1), the POC value of the first target reference picture for the reference PU does not match a POC value of any reference picture in the first reference picture list of the current PU, and the POC value of the second target reference picture for the reference PU matches a POC value of any reference picture in the first reference picture list of the current PU, the video coder may determine the IPMVC based on refMvLY. As shown in line G-115 above, when the current motion vector prediction mode for the current PU is merge mode, the video coder may determine the IDMVC based on the disparity vector of the current PU. As shown in lines G-111 and G-112 above, when the current motion vector prediction mode for the current PU is AMVP mode and the POC value of the second target reference picture for the reference PU is equal to the POC value of the target reference picture for the current PU, the video coder may determine the IPMVC based on refMvLY.

Some example techniques of this disclosure may utilize additional inter-view candidates for AMVP. In some such techniques, when an AMVP candidate mvLXA(B) (i.e., mvLXA or mxLXB) is unavailable and a reference index of a PU corresponds to a temporal (or a short-term) reference picture, the video coder may replace the AMVP candidate with an AMVP candidate derived from the following example methods.

In a first example method, the video coder may locate a reference block of $A(B)_0$ identified by the disparity vector of current PU. In this disclosure, $A(B)_0$ denotes $A_0$ or $B_0$. Next, the video coder may derive the AMVP candidate from the reference block of $A(B)_0$ in the same way as from the reference block of current PU. If the AMVP candidate is available, the video coder may use the AMVP candidate as mvLXA(B). In this disclosure, mvLXA(B) denotes mvLXA or mvLXB. If mvLXA(B) is unavailable, the video coder may use the AMVP candidate from the reference block of $A(B)_1$ in the same way as from the reference block of current PU. In this disclosure, $A(B)_1$ denotes $A_1$ or $B_1$. If the AMVP candidate available, the video coder may use the AMVP candidate as mvLXA(B). If mvLXB is unavailable, the video coder may derive the AMVP candidate from the reference block of $B_2$ in the same way as from the reference block of current PU. If the AMVP candidate available, the video coder may use the AMVP candidate as mvLXB. In one alternative example, if mvLXA(B) is unavailable, the video coder may add a zero motion vector candidate to the AMVP candidate list.

In a second example method, the video coder may locate, based at least in part on a disparity vector, a reference block of a current PU. The video coder may then derive an AMVP candidate from the below-left block of the reference block in the same way as from the reference block of the current PU. If the AMVP candidate is available, the video coder may use the AMVP candidate as mvLXA. Alternatively, the video coder may derive the AMVP candidate from the above-right block of the reference block in the same way as from the reference block of the current PU. If the AMVP candidate is available, the video coder may use the AMVP candidate as mvLXB. If mvLXA(B) is unavailable, the video coder may derive the AMVP candidate from the left (or above) block of the reference block in the same way as from the reference block of current PU. If the AMVP candidate is available, the video coder may use the AMVP candidate as mvLXA(B). If mvLXB is unavailable, the video coder may derive the AMVP candidate from the above-left block of the reference block in the same way as from the reference block of current PU. If the AMVP candidate is available, the video coder may use the AMVP candidate as mvLXB. In one alternative example, if mvLXA(B) is unavailable, the video coder may add a zero motion vector candidate to the AMVP candidate list.

Figure 11:
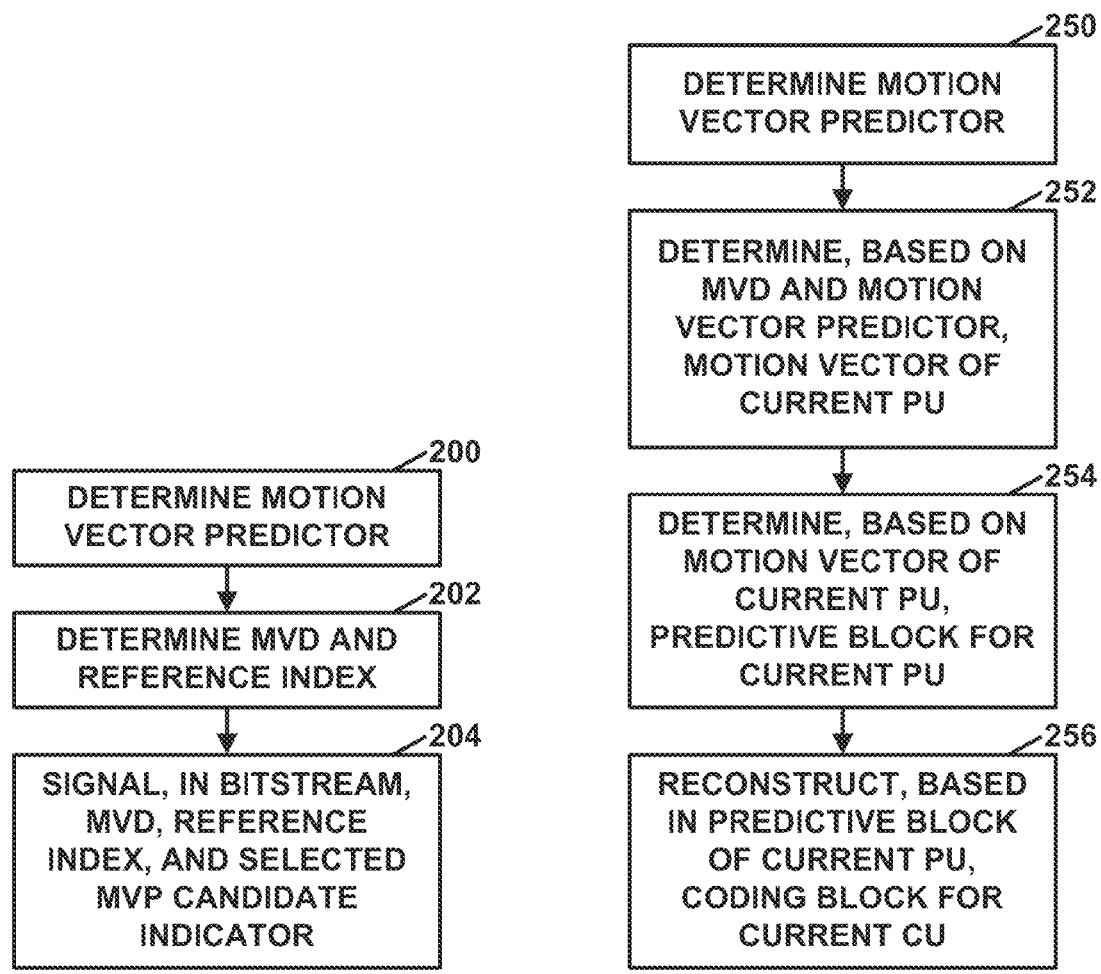
FIG. 11A is a flowchart illustrating a portion of an example encoding operation, in accordance with one or more techniques of this disclosure.
FIG. 11B is a flowchart illustrating a portion of an example decoding operation, in accordance with one or more techniques of this disclosure.

FIG. 11A is a flowchart illustrating a portion of an example encoding operation, in accordance with one or more techniques of this disclosure. In the example of FIG. 11A, video encoder 20 may determine a motion vector predictor for a current PU (200). The motion vector predictor may indicate a motion vector. In some examples, video encoder 20 may determine the motion vector predictor by generating an AMVP candidate list. The AMVP candidate list may include a plurality of AMVP candidates. The plurality of AMVP candidates may include an IPMVC, one or more AMVP candidates that specify motion vectors of PUs that spatially neighbor the current PU, an AMVP candidate that specifies a motion vector of a TMVP, and so on. In this example, video encoder 20 may select an AMVP candidate from the AMVP candidate list as the motion vector predictor for the current PU. Furthermore, video encoder 20 may also determine a MVD and a reference index for the current PU (204). The MVD may indicate a difference between the motion vector predictor for the current PU and the motion vector for the current PU. The reference index may indicate a position of a target reference picture in a reference picture list for the current PU. Video encoder 20 may signal, in a bitstream, the MVD, the reference index for the current PU, and an MVP indicator that indicates the selected AMVP candidate in the AMVP candidate list (204). In some examples, video encoder 20 may repeat the example operation of FIG. 11A for RefPicList0 and RefPicList1.

FIG. 11B is a flowchart illustrating a portion of an example decoding operation, in accordance with one or more techniques of this disclosure. In the example of FIG. 11B, video decoder 30 may determine a motion vector predictor (MVP) for a current PU (250). In some examples, video decoder 30 determines the MVP in accordance with the example operation of FIG. 12, described elsewhere in this disclosure. Furthermore, video decoder 30 may determine, based in part on an MVD obtained from a bitstream and the MVP, a motion vector of the current PU (252). In addition, video decoder 30 may determine, based in part on the motion vector of the current PU and a reference index obtained from the bitstream, a predictive block for the current PU (254). Video decoder 30 may reconstruct, based at least in part on the predictive block for the current PU, a coding block for a current CU (256).

Figure 12:
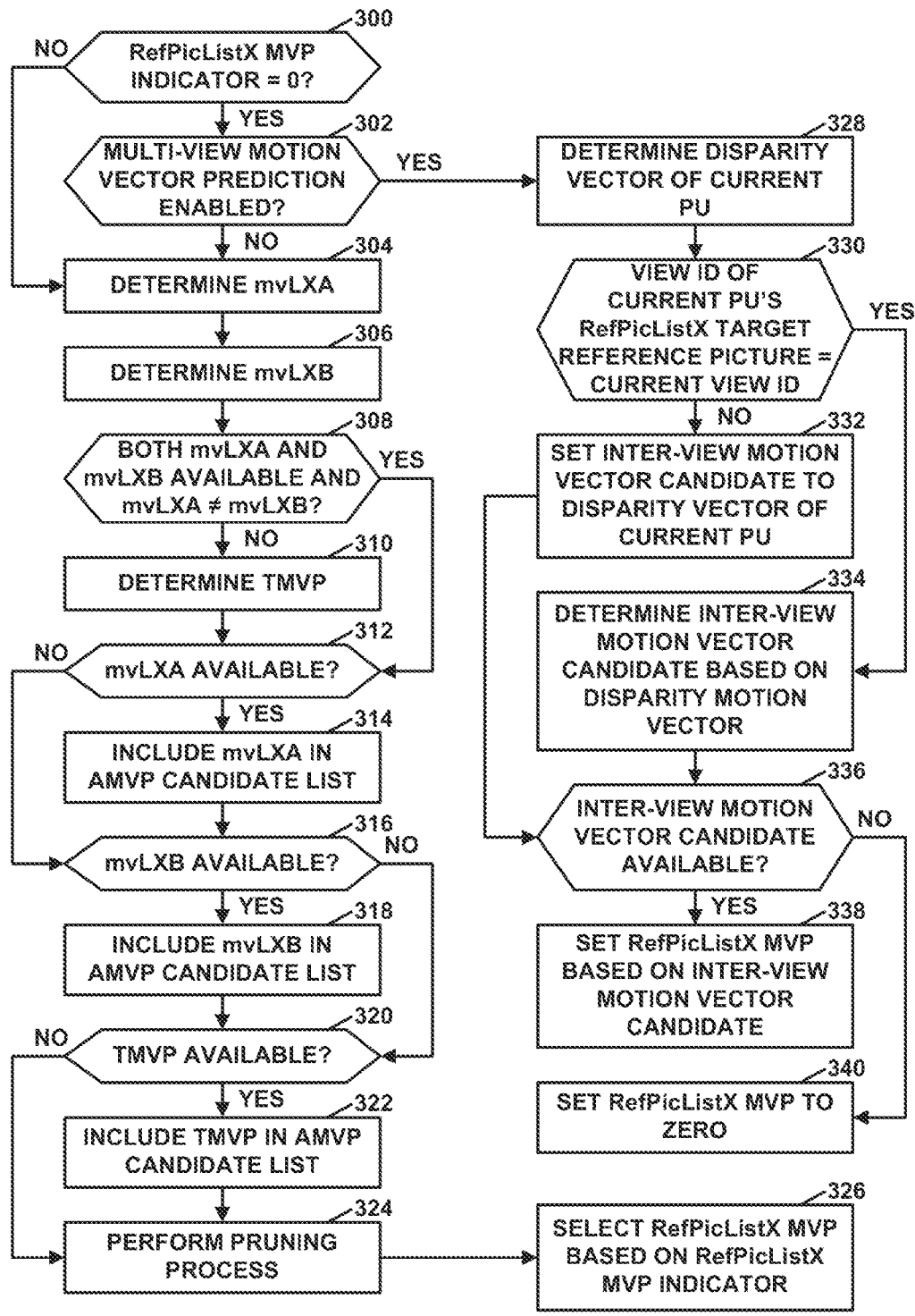
FIG. 12 is a flowchart illustrating an example operation for determining a RefPicListX motion vector predictor, in accordance with one or more techniques of this disclosure.

FIG. 12 is a flowchart illustrating an example operation for determining a RefPicListX motion vector predictor, in accordance with one or more techniques of this disclosure. In the example of FIG. 12, video decoder 30 may determine whether a RefPicListX MVP indicator for a current PU is equal to 0 (300). In response to determining that the RefPicListX MVP indicator for the current PU is equal to 0 ("YES" of 300), video decoder 30 may determine whether multi-view motion vector prediction is enabled for the current PU (302).

When the RefPicListX MVP indicator for the current PU is not equal to 0 ("NO" of 300) or when multi-view motion vector prediction is not enabled for the current PU ("NO" of 302), video decoder 30 may determine mvLXA (304). In the example of FIG. 12, mvLXA is an AMVP candidate derived from a PU covering location $A_0$ or a PU covering location $A_1$ (FIG. 2). In addition, video decoder 30 may determine mvLXB (306). In the example of FIG. 12, mvLXB is an AMVP candidate derived from a PU covering locations $B_0$, $B_1$, or $B_2$ (FIG. 2). Video decoder 30 may then determine whether both mvLXA and mvLXB are available and whether mvLXA is not equal to mvLXB (308). In response to determining that either mvLXA or mvLXB is unavailable or mvLXA is equal to mvLXB ("NO" of 308), video decoder 30 may determine a TMVP (310). After determining the TMVP or when both mvLXA and mvLXB are available and mvLXA is not equal to mvLXB ("YES" of 308), video decoder 30 may determine whether mvLXA is available (312). In response to determining that mvLXA is available, video decoder 30 may include mvLXA in an AMVP candidate list (314). If mvLXA is not available ("NO" of 312) or after including mvLXA in the AMVP candidate list, video decoder 30 may determine whether mvLXB is available (316). In response to determining that mvLXB is available ("YES" of 316), video decoder 30 may include mvLXB in the AMVP candidate list (318). When mvLXB is unavailable ("NO" of 316) or after including mvLXB in the AMVP candidate list, video decoder 30 may determine whether the TMVP is available (320). If video decoder 30 did not determine the TMVP in action 310, the TMVP may be considered to be unavailable. In response to determining that the TMVP is available ("YES" of 320), video decoder 30 may include the TMVP in the AMVP candidate list (322). Video decoder 30 may then perform a pruning process on the AMVP candidate list (324). Subsequently, video decoder 30 may select the RefPicListX MVP from the AMVP candidate list based on the RefPicListX MVP indicator (326).

Otherwise, in response to determining that multi-view motion vector prediction is enabled ("YES" of 302), video decoder 30 may determine a disparity vector for the current PU (328). In addition, video decoder 30 may determine whether a view identifier of the current PU's RefPicListX target reference picture is equal to the current view identifier (330). The current view identifier may identify the view of the picture containing the current PU. In response to determining that the view identifier of the current PU's RefPicListX target reference picture is not equal to the current view identifier ("NO" of 330), video decoder 30 may set an inter-view motion vector candidate to the disparity vector of the current PU (332). In some examples, when the RefPicListX reference index for the current PU refers to an inter-view reference picture, the video coder may determine the inter-view motion vector candidate in accordance with the modified section G.8.5.2.1.17 of 3D-HEVC Test Model 2 described above.

Otherwise, in response to determining that the view identifier of the current PU's RefPicListX target reference picture is equal to the current view identifier ("YES" of 330), video decoder 30 may determine the inter-view motion vector candidate based on a disparity motion vector (334). In some examples, video decoder 30 may perform the operation of FIG. 13 to determine the inter-view motion vector candidate based on the disparity motion vector.

After setting the inter-view motion vector candidate to the disparity vector of the current PU or after determining the inter-view motion vector candidate based on the disparity motion vector, video decoder 30 may determine whether the inter-view motion vector candidate is available (336). In response to determining that the inter-view motion vector candidate is available ("YES" of 336), video decoder 30 may set the RefPicListX MVP based on the inter-view motion vector candidate (338). For instance, video decoder 30 may set the RefPicListX MVP equal to the inter-view motion vector candidate. Otherwise, in response to determining that the inter-view motion vector candidate is not available ("NO" of 336), video decoder 30 may set the RefPicListX MVP to zero (340).

Figure 13:
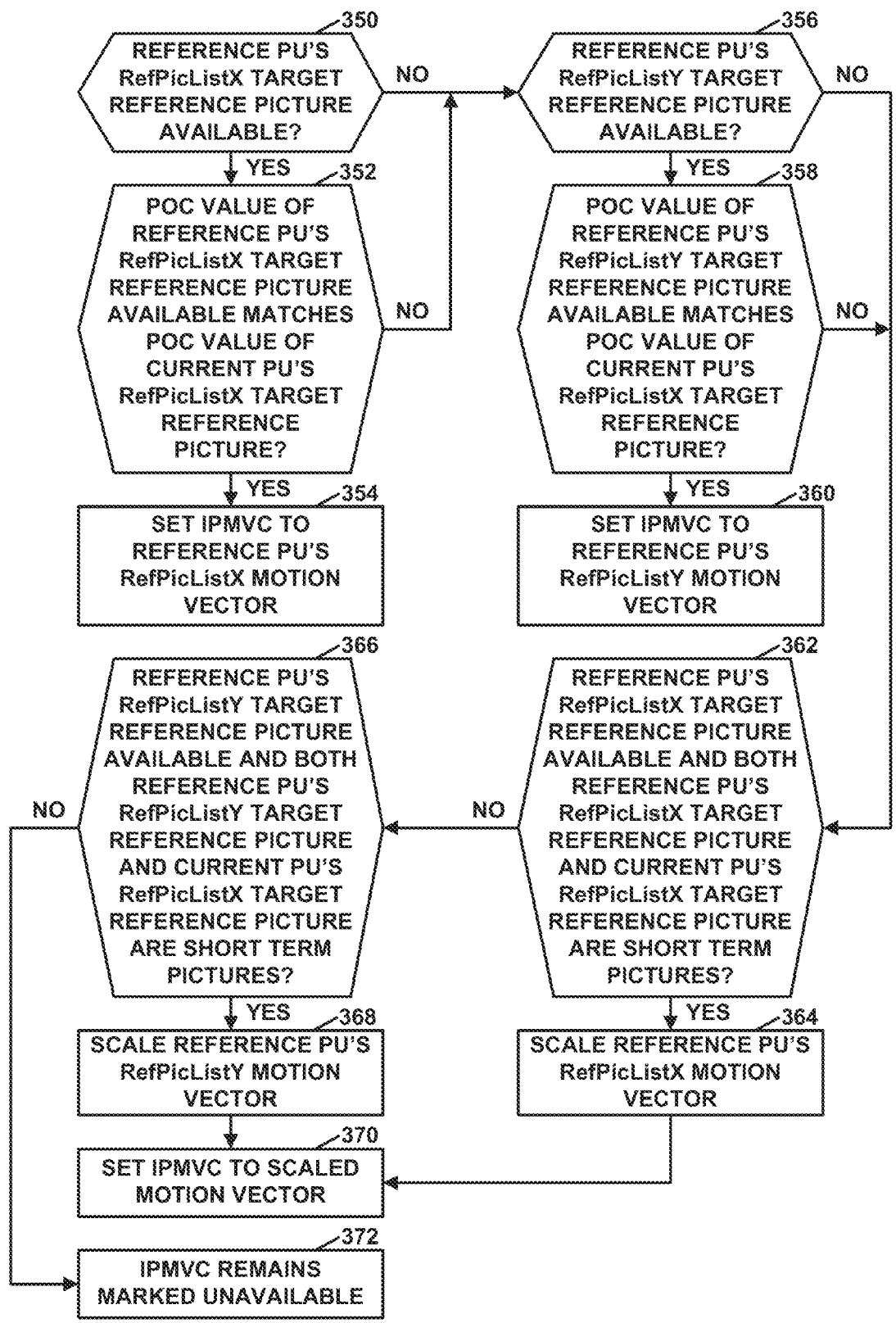
FIG. 13 is a flowchart illustrating an example operation for determining an IPMVC, in accordance with one or more techniques of this disclosure.

FIG. 13 is a flowchart illustrating an example operation for determining an IPMVC, in accordance with one or more techniques of this disclosure. A video coder may perform the example operation of FIG. 13 when determining an IPMVC for the purpose of determining a current PU's RefPicList0 motion vector or RefPicList1 motion vector. In other words, the video coder may perform the operation of FIG. 13 when generating an IPMVC for the purpose of determining a RefPicListX motion vector of the current PU. Prior to performing the example operation of FIG. 13, the video coder may determine, based on a disparity vector for a current PU, a reference PU. In addition, the video decoder may mark the IPMVC as unavailable and may set the IPMVC to zero.

As illustrated in the example of FIG. 13, the video coder may determine whether the reference PU's RefPicListX target reference picture is available (350). In other words, the video coder may determine whether the reference PU is predicted, at least in part, from a reference picture in the reference PU's RefPicListX. For example, in the modified section G.8.5.1.1.15 of 3D-HEVC Test Model 2 described above, refPredFlagLX may indicate whether the reference PU is predicted from a reference picture in the reference PU's refPicListX. In this example, the video coder may determine whether the reference PU's refPicListX is equal to 1.

When the reference PU's RefPicListX target reference picture is available ("YES" of 350), the video coder may determine whether the reference PU's RefPicListX target reference picture has the same POC value as the current PU's RefPicListX target reference picture (352). For example, in the modified section G.8.5.1.1.15 of 3D-HEVC Test Model 2 described above, the video coder may determine whether the POC value of the picture refRefPicListLX [refRefIdxLX] is equal to the POC value of the picture RefPicListLX[i].

In response to determining that the reference PU's RefPicListX target reference picture has the same POC value as the current PU's RefPicListX target reference picture ("YES" of 352), the video coder may mark the IPMVC as available and set the IPMVC to the reference PU's RefPicListX motion vector (354). For example, in the modified section G.8.5.1.1.15 of 3D-HEVC Test Model 2 described above, the flag availableFlagLXInterView is set equal to 1 and the following applies:
    mvLXInterView[0]=refMvLX[0]
    mvLXInterView[1]=refMvLX[1]

However, in response to determining that the reference PU's RefPicListX target reference picture is not available ("NO" of 350) or in response to determining that the reference PU's RefPicListX target reference picture does not have the same POC value as the current PU's RefPicListX target reference picture ("NO" of 352), the video coder may determine whether the reference PU's RefPicListY target reference picture is available (356). In other words, the video coder may determine whether the reference PU is predicted from a reference picture in the reference PU's RefPicListY.

In response to determining that the reference PU's RefPicListY target reference picture is available ("YES" of 356), the video coder may determine whether the POC value of the reference PU's RefPicListY target reference picture matches the POC value of the current PU's RefPicListX target reference picture (358). In response to determining that the POC value of the reference PU's RefPicListY target reference picture matches the POC value of the current PU's RefPicListX target reference picture ("YES" of 358), video decoder 30 may mark the IPMVC as available and set the IPMVC to the reference PU's RefPicListX motion vector (360). For example, in the modified section G.8.5.1.1.15 of 3D-HEVC Test Model 2 described above, the flag availableFlagLXInterView is set equal to 1 and the following applies:
    mvLXInterView[0]=refMvLY[0]
    mvLXInterView[1]=refMvLY[1]

Furthermore, the example of FIG. 13 includes steps associated with scaling motion vectors. In alternative examples, the video coder may determine that the IPMVC is unavailable when the reference PU's RefPicListY target reference picture is not available ("NO" of 356) or in response to determining that the POC value of the reference PU's RefPicListY target reference picture does not match the POC value of the current PU's RefPicListX target reference picture ("NO" of 358) and the operation of FIG. 13 may end. However, in the example of FIG. 13, in response to determining that the reference PU's RefPicListY target reference picture is not available ("NO" of 356) or in response to determining that the POC value of the reference PU's RefPicListY target reference picture does not match the POC value of the current PU's RefPicListX target reference picture ("NO" of 358), the video coder may determine whether the reference PU's RefPicListX target reference picture is available and whether both the reference PU's RefPicListX target reference picture and the current PU's RefPicListX target reference picture are short-term reference pictures (362). In response to determining that the reference PU's RefPicListX target reference picture is available and both the reference PU's RefPicListX target reference picture and the current PU's RefPicListX target reference picture are short-term reference pictures ("YES" of 362), the video coder may scale the reference PU's RefPicListX motion vector based on a POC distance between the reference PU's RefPicListX target reference picture and the current PU's RefPicListX target reference picture (364).

In response to determining that the reference PU's RefPicListX target reference picture is not available or one or both of the reference PU's RefPicListX target reference picture and the current PU's RefPicListX target reference picture is not a short-term reference picture ("NO" of 362), the video coder may determine whether the reference PU's RefPicListY target reference picture is available and whether both the reference PU's RefPicListY target reference picture and the current PU's RefPicListX target reference picture are short-term reference pictures (368). In response to determining that the reference PU'S RefPicListY target reference picture is available and both the reference PU's RefPicListY target reference picture and the current PU's RefPicListX target reference picture are short-term reference pictures ("YES" of 366), the video coder may scale the reference PU's RefPicListY motion vector based on a POC distance between the reference PU's RefPicListY target reference picture and the current PU's RefPicListX target reference picture (368). The video coder may set the IPMVC to the scaled motion vector generated in (364) or (368).

Otherwise, in response to determining that the reference PU's RefPicListY target reference picture is not available or one or both of the reference PU's RefPicListY target reference picture and the current PU's RefPicListX target reference picture is not a short-term reference picture ("NO" of 366), the IPMVC may remain marked as unavailable (372).

In addition to the steps associated with scaling of motion vectors, the example operation of FIG. 13 contrasts with the operation of FIG. 8 in several ways. For example, in FIG. 13, when the video coder is determining an IPMVC to derive the current PU's RefPicListX motion vector, the video coder first checks RefPicListX and then checks RefPicListY. In contrast, in FIG. 8, when the video coder is determining an IPMVC to derive the current PU's RefPicListX motion vector, the video coder first checks RefPicList0 and then checks RefPicList1.

Figure 14:
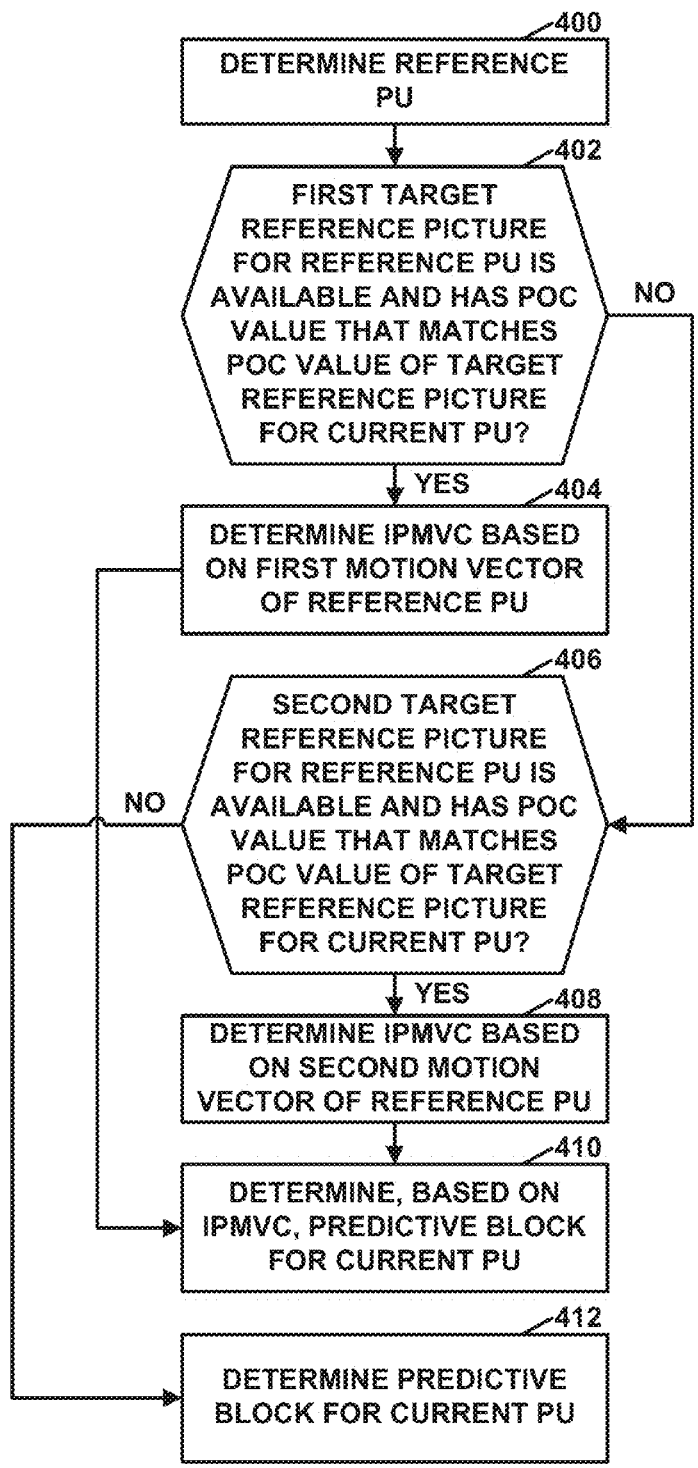
FIG. 14 is a flowchart illustrating an example operation of a video decoder, in accordance with one or more techniques of this disclosure.

FIG. 14 is a flowchart illustrating an example operation of video decoder 30, in accordance with one or more techniques of this disclosure. In the example of FIG. 14, video decoder 30 may determine, based at least in part on a disparity vector of a current PU of a current picture, a reference PU for the current PU (400). For example, the current PU's disparity vector may indicate a location within a reference picture that contains the reference PU. In this example, the reference PU may cover the location indicated by the current PU's disparity vector. The reference PU is in a reference picture that is in the same access unit as the current picture and is in a different view than the current picture. Furthermore, in the example of FIG. 14, a first reference index for the reference PU indicates a position, within a first reference picture list (e.g., RefPicList1) of the reference PU, of a first target reference picture for the reference PU. The first reference picture list for the reference PU has a reference picture list index equal to 1.

Furthermore, video decoder 30 may determine whether the first target reference picture for the reference PU is available and a POC value of the first target reference picture for the reference PU matches a POC value of a target reference picture for the current PU (402). In some examples, the first target reference picture for the reference PU is available when the first reference index for the reference PU is greater than or equal to 0. When the first target reference picture for the reference PU is available and the POC value of the first target reference picture for the reference PU matches a POC value of a target reference picture for the current PU ("YES" of 402), video decoder 30 may determine the IPMVC based on a first motion vector of the reference PU (404). For instance, the IPMVC may be equal to, or may be a scaled version of, the first motion vector of the reference PU. The first motion vector of the reference PU may indicate a spatial displacement between a prediction block of the reference PU and a position within the first target reference picture for the reference PU. A reference index signaled for the current PU may indicate a position, within a first reference picture list of the current PU, of the target reference picture for the current PU. A reference picture list index for the reference picture list of the current PU is equal to 1. That is, the first reference picture list of the current PU may be the current picture's RefPicList1.

When the first target reference picture for the reference PU is not available or the first target reference picture for the reference PU does not have a POC value that matches the POC value of the target reference picture for the current PU ("NO" of 402), video decoder 30 may determine whether a second target reference picture for the reference PU is available and whether a POC value of the second target reference picture for the reference PU matches the POC value of the target reference picture for the current PU (406). A second reference index of the reference PU indicates a position, within a second reference picture list (e.g., RefPicList0) of the reference PU, of the second target reference picture for the reference PU. In some examples, the second target reference picture for the reference PU is available when the second reference index for the reference PU is greater than or equal to 0. The second reference picture list of the reference PU has a reference picture list index equal to 0. Hence, the second reference picture list of the reference PU may be the reference picture's RefPicList0.

When the second target reference picture for the reference PU is available and the POC value of the second target reference picture for the reference PU matches the POC value of the target reference picture for the current PU ("YES" of 406), video decoder 30 may determine the IPMVC based on a second motion vector of the reference PU (408). For instance, the IPMVC may be equal to, or may be a scaled version of, the second motion vector of the reference PU. The second motion vector of the reference PU indicates a spatial displacement between the prediction block of the reference PU and a position within the second target reference picture for the reference PU.

After determining the IPMVC based on the first or the second motion vector for the reference PU, video decoder 30 may determine, based on the IPMVC, a predictive block for the current PU (412). For example, video decoder 30 may determine, by adding a motion vector specified by the IPMVC and a MVD, a motion vector for the current PU. Video decoder 30 may then determine a sample block comprising actual or interpolated samples of the current PU's target reference picture that are associated with a location indicated by the motion vector for the current PU. In instances where the current PU is uni-directionally predicted, this sample block may be the predictive block for the current PU. In instances where the current PU is bi-directionally predicted, video decoder 30 may generate the predictive block for the current PU based on this sample block and a sample block that contains actual or interpolated samples of another target reference picture of the current PU.

In response to determining that the second target reference picture for the reference PU is not available or that the POC value of the second target reference picture for the reference PU does not match the POC value of the target reference picture for the current PU ("NO" of 406), video decoder 30 may determine the predictive block for the current PU without including the IPMVC in the candidate list. In other examples, if the first target reference picture for the reference PU is available, but the POC value of the first target reference picture for the reference PU does not match the POC value of the target reference picture for the current PU in (402), video decoder 30 may generate a scaled version of the first motion vector for the reference PU and include the scaled version of the first motion vector for the reference PU in the candidate list. Moreover, if the second target reference picture for the reference PU is available, but the POC value of the second target reference picture for the reference PU does not match the POC value of the target reference picture for the current PU in (406), video decoder 30 may generate a scaled version of the second motion vector for the reference PU and include the scaled version of the second motion vector for the reference PU in the candidate list.

Figure 15:
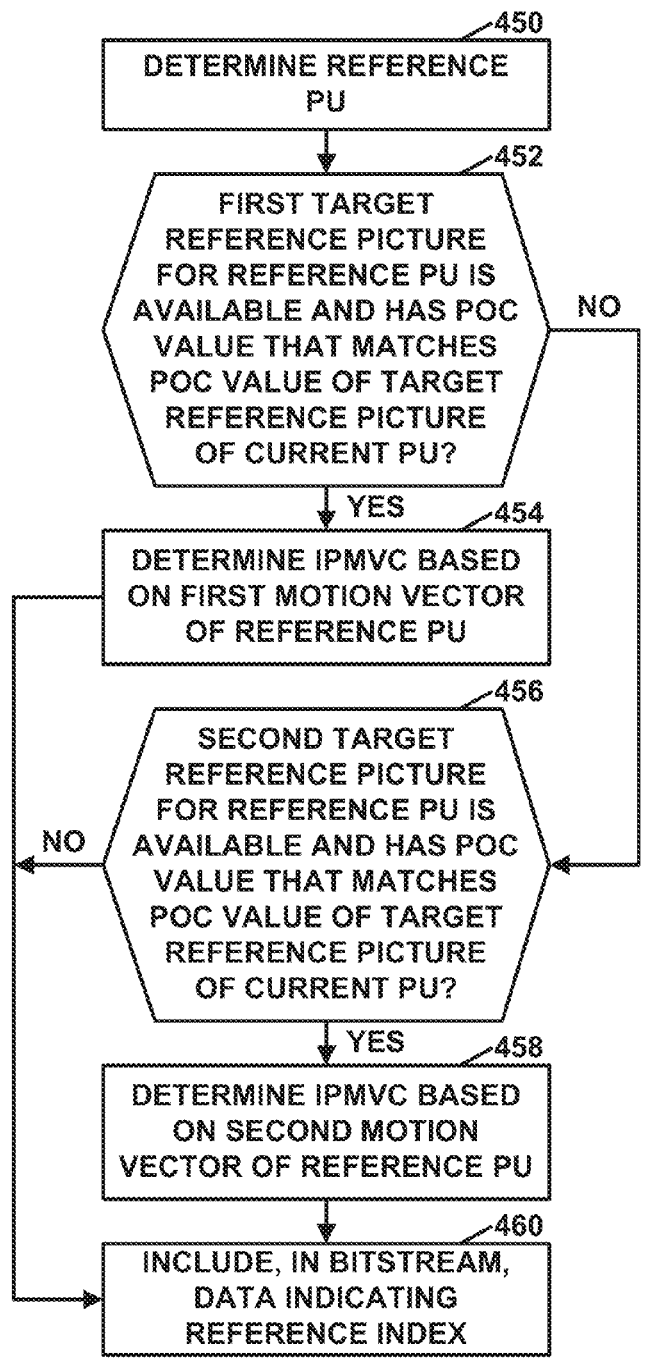
FIG. 15 is a flowchart illustrating an example operation of a video encoder, in accordance with one or more techniques of this disclosure.

FIG. 15 is a flowchart illustrating an example operation of video encoder 20, in accordance with one or more techniques of this disclosure. In the example of FIG. 15, video encoder 20 may determine, based at least in part on a disparity vector of a current PU of a current picture, a reference PU for the current PU (450). The reference PU is in a reference picture that is in the same access unit as the current picture. A first reference index for the reference PU indicates a position, within a first reference picture list of the reference PU, of a first target reference picture for the reference PU. The first reference picture list for the reference PU has a reference picture list index equal to 1 (e.g., the first reference picture list is RefPicList1).

Furthermore, in the example of FIG. 15, video encoder 20 may determine whether a first target reference picture for the reference PU is available and a POC value of the first target reference picture for the reference PU matches a POC value of the target reference picture for the current PU (452). In some examples, the first target reference picture for the reference PU is available when the first reference index for the reference PU is greater than or equal to 0. When the first target reference picture for the reference PU is available and the POC value of the first target reference picture for the reference PU matches the POC value of the target reference picture for the current PU ("YES" of 452), video encoder 20 may determine an IPMVC based on a first motion vector of the reference PU (454). For instance, the IPMVC may be equal to, or may be a scaled version of, the first motion vector of the reference PU. The first motion vector of the reference PU may indicate a spatial displacement between a sample block of the reference PU and a position within the first target reference picture for the reference PU. A reference index signaled for the current PU indicates a position, within a reference picture list of the current PU, of the target reference picture for the current PU. In this example, a reference picture list index for the reference picture list of the current PU is equal to 1. That is, the reference index signal for the current CU is a RefPicList1 reference index.

When the first target reference picture for the reference PU is not available or the first target reference picture for the reference PU does not have a POC value that matches the POC value of the target reference picture for the current PU ("NO" of 452), video encoder 20 may determine whether a second target reference picture for the reference PU is available and whether a POC value of the second target reference picture for the reference PU matches the POC value of the target reference picture for the current PU (456). A second reference index of the reference PU indicates a position, within a second reference picture list of the reference PU, of the second target reference picture for the reference PU. The second reference picture list of the reference PU has a reference picture list index equal to 0. That is, the second reference index of the reference PU is a RefPicList0 reference index. In some examples, the second target reference picture for the reference PU is available when the second reference index for the reference PU is greater than or equal to 0.

When the second target reference picture for the reference PU is available and the POC value of the second target reference picture for the reference PU matches the POC value of the target reference picture for the current PU ("YES" of 456), video encoder 20 may determine the IPMVC based on a second motion vector of the reference PU (458). For instance, the IPMVC may be equal to, or may be a scaled version of, the second motion vector of the reference PU. The second motion vector of the reference PU may indicate a spatial displacement between the sample block of the reference PU and a position within the second target reference picture for the reference PU.

After determining the IPMVC, or when video encoder 20 determines that the second target reference picture for the reference PU is not available or the POC value of the second target reference picture for the reference PU does not match the POC value of the target reference picture for the current PU ("NO" of 456), video encoder 20 may include, in a bitstream, data indicating a reference index that indicates a position, within a reference picture list of the current PU, of the target reference picture for the current PU (460).

Thus, in accordance with one or more example techniques of this disclosure, a video coder may determine, based at least in part on a disparity vector of a current PU of a current picture, a reference PU for the current PU. The reference PU is in a reference picture that is in the same access unit as the current picture and is in a different view than the current picture. A first reference index for the reference PU indicates a position, within a first reference picture list of the reference PU, of a first target reference picture for the reference PU. The first reference picture list for the reference PU has a reference picture list index equal to 1. When the first target reference picture for the reference PU is available and a POC value of the first target reference picture for the reference PU matches a POC value of a target reference picture for the current PU, determining an IPMVC based on a first motion vector of the reference PU. The first motion vector of the reference PU indicates a spatial displacement between a prediction block of the reference PU and a position within the first target reference picture for the reference PU. A reference index signaled for the current PU indicates a position, within a reference picture list of the current PU, of the target reference picture for the current PU. A reference picture list index for the reference picture list of the current PU is equal to 1. Furthermore, when the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, determining the IPMVC based on a second motion vector of the reference PU. A second reference index of the reference PU indicates a position, within a second reference picture list of the reference PU, of the second target reference picture for the reference PU, the second reference picture list of the reference PU having a reference picture list index equal to 0. The second motion vector of the reference PU indicates a spatial displacement between the prediction block of the reference PU and a position within the second target reference picture for the reference PU.

The following are additional examples of the techniques of this disclosure.

Example 1

A method of coding video data, the method comprising: in response to determining that a reference picture in a target reference picture list is available and has a POC value that is the same as a POC value of a target reference picture of a current PU, including, in an AMVP candidate list, a motion vector of a reference block in the reference picture in the target reference picture list; in response to determining that the reference picture in the target reference picture list is not available or the reference picture in the target reference picture list does not have a POC value that is the same as the POC value of the target reference picture of the current PU, determining whether a reference picture in a non-target reference picture list is available and has a POC value that is the same as the POC value of the target reference picture of the current PU; and in response to determining that the reference picture in the non-target reference picture list is available and has a POC value that is the same as the POC value of the target reference picture of the current PU, including, in the AMVP candidate list, a motion vector of the reference block in the reference picture in the non-target reference picture list.

Example 2

A method of coding video data, the method comprising: generating, based on a motion vector of a reference block, an AMVP candidate for a current PU that corresponds to a temporal short-term reference picture; and scaling the motion vector of the reference block, regardless of whether the motion vector points to a different access unit than the current PU.

Example 3

The method of example 2, further comprising: determining a reference block identified by a disparity vector of the current PU; in response to determining that a first reference index of the reference block is available and that a reference picture indicated by the first reference index of the reference block has a same POC value as a reference picture indicated by a target reference index of the current PU, setting the AMVP candidate equal to a first motion vector of the reference block; in response to determining that the first reference index of the reference block is not available or that the reference picture indicated by the first reference index of the reference block does not have the same POC value as the reference picture indicated by the target reference index of the current PU, and that a second reference index of the reference block is available and that a reference picture indicated by the second reference index of the reference block has a same POC value as the reference picture indicated by the target reference index of the current PU, setting the AMVP candidate equal to a second motion vector of the reference block; in response to determining that the first reference index of the reference block is available and that the reference picture indicated by the first reference index of the reference block and the reference picture indicated by the target reference index of the current PU are both short-term pictures, scaling the first motion vector of the reference block and adding the scaled first motion vector of the reference block to an AMVP candidate list; in response to determining that the second reference index of the reference block is available and that the reference picture indicated by the second reference index of the reference block and the reference picture indicated by the target reference index of the current PU are both short-term pictures, scaling the second motion vector of the reference block and adding the scaled second motion vector of the reference block to the AMVP candidate list.

Example 4

A method of coding video data, the method comprising determining, based on an inter-view predicted motion vector candidate, a TMVP, and one or more spatial AMVP candidates, a first final AMVP candidate for a current PU and a second final AMVP candidate for the current PU.

Example 5

A method of coding video data, the method comprising: generating a TMVP in response to determining that an inter-view predicted motion vector candidate is unavailable; and determining, based at least in part on the TMVP, a first final AMVP candidate for a current PU and a second final AMVP candidate for the current PU.

Example 6

A method of coding video data, the method comprising: generating an inter-view predicted motion vector candidate in response to determining that a TMVP is unavailable; and determining, based at least in part on the inter-view predicted motion vector candidate, a first final AMVP candidate for a current PU and a second final AMVP candidate for the current PU.

Example 7

A method of coding video data, the method comprising: determining, based on one or more blocks that spatially neighbor a current PU, a first motion vector candidate; in response to determining that the first motion vector candidate is unavailable and that a target reference index of the current PU corresponds to a short-term temporal reference picture: locating, based at least in part on a disparity vector of the current PU, a reference block of a block that spatially neighbors the current PU; deriving a second motion vector candidate from the reference block; and substituting, in a candidate list, the first motion vector candidate with the second motion vector candidate.

Example 8

The method of example 7, wherein: the one or more blocks that spatially neighbor the current PU include a particular spatially neighboring block, and determining the first motion vector candidate comprises: in response to determining that a first reference index of the particular spatially neighboring block is available and that the first reference index of the particular spatially neighboring block is equal to a first decoded reference index of the current PU, determining that the first motion vector candidate is equal to a first motion vector of the particular spatially neighboring block; in response to determining that the first reference index of the particular spatially neighboring block is not available or that the first reference index of the particular spatially neighboring block is not equal to the first decoded reference index of the current PU and that a second reference index of the particular spatially neighboring block is available and that a reference picture indicated by the second reference index of the particular spatially neighboring block has a same POC value as a reference picture indicated by the first decoded reference index of the current PU, determining that the first motion vector candidate is equal to a second motion vector of the particular spatially neighboring block; in response to determining that the first reference index of the particular spatially neighboring block is available and that a reference picture indicated by the first reference index of the particular spatially neighboring block and the reference picture indicated by the first decoded reference index of the current PU are both short-term pictures or both long-term pictures, determining that the first motion vector candidate is equal to the first motion vector of the particular spatially neighboring block; in response to determining that the second reference index of the particular spatially neighboring block is available and that the reference picture indicated by the second reference index of the particular spatially neighboring block and a reference picture indicated by a second decoded reference index of the current PU are both short-term pictures or both long-term pictures, determining that the first motion vector candidate is equal to the second motion vector of the particular spatially neighboring block.

Example 9

The method of any of examples 1-8 or combinations thereof, further comprising encoding the current PU.

Example 10

The method of any of examples 1-8 or combinations thereof, further comprising decoding the current PU.

Example 11

A method comprising any combination of examples 1-10.

Example 12

A video coding device that comprises one or more computer processors configured to perform the methods of any of examples 1-10 or combinations thereof.

Example 13

A computer-readable storage medium that stores instructions that, when executed by one or more processors of a video coding device, configure the video coding device to perform the methods of any of claims 1-10 or combinations thereof.

Example 14

A video coding device that comprises means for performing the methods of any of examples 1-10 or combinations thereof.

Example 15

A video coding device comprising means for including, in response to determining that a reference picture in a particular reference picture list is available and has a POC value that is the same as a POC value of a target reference picture of a current PU, in an AMVP candidate list, a motion vector of a reference block in the reference picture.

Example 16

A video coding device comprising: means for generating, based on a motion vector of a reference block, an AMVP candidate for a current prediction unit (PU) that corresponds to a temporal short-term reference picture; and means for scaling the motion vector of the reference block, regardless of whether the motion vector points to a different access unit than the current PU.

Example 17

A video coding device comprising means for determining, based on an inter-view predicted motion vector candidate, a TMVP, and one or more spatial AMVP candidates, a first final AMVP candidate for a current PU and a second final AMVP candidate for the current PU.

Example 18

A video coding device comprising: means for generating a TMVP in response to determining that an inter-view predicted motion vector candidate is unavailable; and means for determining, based at least in part on the TMVP, a first final AMVP candidate for a current PU and a second final AMVP candidate for the current PU.

Example 19

A video coding device comprising: means for generating an inter-view predicted motion vector candidate in response to determining that a TMVP is unavailable; and means for determining, based at least in part on the inter-view predicted motion vector candidate, a first final AMVP candidate for a current PU and a second final AMVP candidate for the current PU.

Example 20

A video coding device comprising: means for determining, based on one or more blocks that spatially neighbor a current PU, a first motion vector candidate; means for, in response to determining that the first motion vector candidate is unavailable and that a target reference index of the current PU corresponds to a short-term temporal reference picture: locating a reference block using a disparity vector of the current PU; deriving a second motion vector candidate from the reference block; and substituting, in a candidate list, the first motion vector candidate with the second motion vector candidate.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data according to an advanced motion vector prediction (AMVP) mode, the method comprising:
    determining, based at least in part on a disparity vector of a current prediction unit (PU) of a current picture, a reference PU for the current PU, wherein the reference PU is in a reference picture that is in the same access unit as the current picture and is in a different view than the current picture, wherein a first reference index for the reference PU indicates a position, within a first reference picture list for the reference PU, of a first target reference picture for the reference PU, and wherein the first reference picture list for the reference PU has a reference picture list index equal to 1;
    determining an inter-view prediction motion vector candidate (IPMVC),
        wherein, based on a determination that the first target reference picture for the reference PU is available and a Picture Order Count (POC) value of the first target reference picture for the reference PU matches a POC value of a target reference picture for the current PU, the IPMVC is determined based on a first motion vector of the reference PU,
        wherein the first motion vector of the reference PU indicates a spatial displacement between a prediction block of the reference PU and a position within the first target reference picture for the reference PU,
        wherein a reference index signaled for the current PU indicates a position, within a reference picture list for the current PU, of the target reference picture for the current PU, and
        wherein a reference picture list index for the reference picture list for the current PU is equal to 1;
        wherein, based on a determination that the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, the IPMVC is determined based on a second motion vector of the reference PU,
        wherein a second reference index of the reference PU indicates a position, within a second reference picture list for the reference PU, of the second target reference picture for the reference PU, the second reference picture list for the reference PU having a reference picture list index equal to 0,
        wherein the second motion vector of the reference PU indicates a spatial displacement between the prediction block of the reference PU and a position within the second target reference picture for the reference PU;
    determining, based on the IPMVC, a predictive block for the current PU; and
    reconstructing the current PU based on the predictive block according to the AMVP mode.

2. The method of claim 1, wherein:
    the first target reference picture for the reference PU is available when the first reference index for the reference PU is greater than or equal to 0, and
    the second target reference picture for the reference PU is available when the second reference index for the reference PU is greater than or equal to 0.

3. The method of claim 1, further comprising:
    based on a determination that the first target reference picture for the reference PU is available, and the first target reference picture for the reference PU and the target reference picture for the current PU both belong to a picture type, scaling the first motion vector of the reference PU based on a first POC distance, wherein the IPMVC is equal to the scaled first motion vector of the reference PU; and
    based on a determination that the second target reference picture for the reference PU is available, and the second target reference picture for the reference PU and the target reference picture for the current PU both belong to the picture type, scaling the second motion vector of the reference PU based on a second POC distance, wherein the IPMVC is equal to the scaled second motion vector of the reference PU.

4. The method of claim 3, further comprising based on a determination that the second target reference picture for the reference PU is not available, including a zero motion vector in a candidate list.

5. The method of claim 3, wherein the picture type is short-term pictures.

6. The method of claim 1, further comprising:
    based on a determination that the first target reference picture for the reference PU is available, the first target reference picture for the reference PU does not have the same POC value as the target reference picture for the current PU, and both the first target reference picture for the reference PU and the target reference picture for the current PU belong to a picture type, scaling the first motion vector for the reference PU based on a first POC distance, wherein the IPMVC specifies the scaled first motion vector for the reference PU;
    based on a determination that the first target reference picture for the reference PU is not available, the first target reference picture for the reference PU does not have the same POC value as the target reference picture for the current PU, or the first target reference picture for the reference PU and the target reference picture for the current PU do not both belong to the picture type, and the second target reference picture for the reference PU is available, and the second target reference picture for the reference PU and the target reference picture for the current PU have the same POC value, setting the IPMVC to the second motion vector of the reference PU; and
    based on a determination that the first target reference picture for the reference PU is not available, the first target reference picture for the reference PU does not have the same POC value as the target reference picture for the current PU, the first target reference picture for the reference PU and the target reference picture for the current PU do not both belong to the picture type, the second target reference picture for the reference PU is available, the second target reference picture for the reference PU and the target reference picture for the current PU do not have the same POC value, and the second target reference picture for the reference PU and the target reference picture for the current PU both belong to the picture type, scaling the second motion vector for the reference PU based on a second POC distance, wherein the IPMVC indicates the scaled second motion vector for the reference PU.

7. The method of claim 6, wherein the picture type is short-term pictures.

8. The method of claim 1, further comprising including a temporal motion vector predictor (TMVP) candidate in an AMVP candidate list only when the IPMVC is unavailable.

9. The method of claim 1, further comprising including the IPMVC in an AMVP candidate list only when a TMVP candidate is unavailable.

10. The method of claim 1, further comprising substituting, in an AMVP candidate list, the IPMVC for a spatial motion vector predictor candidate when the spatial motion vector predictor candidate is unavailable and the target reference picture for the current PU is a temporal reference picture.

11. A method of encoding video data according to an advanced motion vector prediction (AMVP) mode, the method comprising:
determining, based at least in part on a disparity vector of a current prediction unit (PU) of a current picture, a reference PU for the current PU, wherein the reference PU is in a reference picture that is in the same access unit as the current picture and is in a different view than the current picture, wherein a first reference index for the reference PU indicates a position, within a first reference picture list for the reference PU, of a first target reference picture for the reference PU, and wherein the first reference picture list for the reference PU has a reference picture list index equal to 1;
determining an inter-view prediction motion vector candidate (IPMVC),
wherein, based on a determination that the first target reference picture for the reference PU is available and a Picture Order Count (POC) value of the first target reference picture for the reference PU matches a POC value of a target reference picture for the current PU, an inter-view prediction motion vector candidate (IPMVC) is determined based on a first motion vector of the reference PU,
wherein the first motion vector of the reference PU indicates a spatial displacement between a prediction block of the reference PU and a position within the first target reference picture for the reference PU,
wherein a reference index signaled for the current PU indicates a position, within a reference picture list for the current PU, of the target reference picture for the current PU, and
wherein a reference picture list index for the reference picture list of the current PU is equal to 1;
wherein, based on a determination that the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, the IPMVC is determined based on a second motion vector of the reference PU,
wherein a second reference index of the reference PU indicates a position, within a second reference picture list for the reference PU, of the second target reference picture for the reference PU, the second reference picture list for the reference PU having a reference picture list index equal to 0,
wherein the second motion vector of the reference PU indicates a spatial displacement between the prediction block of the reference PU and a position within the second target reference picture for the reference PU; and
including, in a bitstream, data indicating a reference index that indicates a position, within the reference picture list of the current PU, of the target reference picture for the current PU.

12. The method of claim 11, wherein:
the first target reference picture for the reference PU is available when the first reference index for the reference PU is greater than or equal to 0, and
the second target reference picture for the reference PU is available when the second reference index for the reference PU is greater than or equal to 0.

13. The method of claim 11, further comprising:
based on a determination that the first target reference picture for the reference PU is available, and the first target reference picture for the reference PU and the target reference picture for the current PU both belong to a picture type, scaling the first target motion vector of the reference PU based on a first POC distance, wherein the IPMVC is equal to the scaled first motion vector of the reference PU; and
based on a determination that the second target reference picture for the reference PU is available, and the second target reference picture for the reference PU and the target reference picture for the current PU both belong to the picture type, scaling the second motion vector of the reference PU based on a second POC distance, wherein the IPMVC is equal to the scaled second motion vector of the reference PU.

14. The method of claim 13, further comprising, based on a determination that the second target reference picture for the reference PU is not available, including a zero motion vector in a candidate list.

15. The method of claim 13, wherein the picture type is short-term pictures.

16. The method of claim 11, further comprising:
based on a determination that the first target reference picture for the reference PU is available, the first target reference picture for the reference PU does not have the same POC value as the target reference picture for the current PU, and both the first target reference picture for the reference PU and the target reference picture for the current PU belong to a picture type, scaling the first motion vector for the reference PU based on a first POC distance, wherein the IPMVC specifies the scaled first motion vector for the reference PU;
based on a determination that the first target reference picture for the reference PU is not available, the first target reference picture for the reference PU does not have the same POC value as the target reference picture for the current PU, or the first target reference picture for the reference PU and the target reference picture for the current PU do not both belong to the picture type, and the second target reference picture for the reference PU is available, and the second target reference picture for the reference PU and the target reference picture for the current PU have the same POC value, setting the IPMVC to the second motion vector of the reference PU;

based on a determination that the first target reference picture for the reference PU is not available, the first target reference picture for the reference PU does not have the same POC value as the target reference picture for the current PU, the first target reference picture for the reference PU and the target reference picture for the current PU do not both belong to the picture type, the second target reference picture for the reference PU is available, the second target reference picture for the reference PU and the target reference picture for the current PU do not have the same POC value, and the second target reference picture for the reference PU and the target reference picture for the current PU both belong to the picture type, scaling the second motion vector for the reference PU based on a second POC distance, wherein the IPMVC indicates the scaled second motion vector for the reference PU.

17. The method of claim 16, wherein the picture type is short-term pictures.

18. The method of claim 11, further comprising including, in a candidate list, a temporal motion vector predictor (TMVP) candidate only when the IPMVC is unavailable.

19. The method of claim 11, further comprising including, in a candidate list, the IPMVC only when a TMVP candidate is unavailable.

20. The method of claim 11, further comprising substituting, in a candidate list, the IPMVC for a spatial motion vector predictor candidate when the spatial motion vector predictor candidate is unavailable and the target reference picture for the current PU is a temporal reference picture.

21. A video coding device configured to code video data according to an advanced motion vector prediction (AMVP), the video coding device comprising:
a memory configured to store data associated with a current prediction unit (PU) of a current picture of the video data; and
one or more processors configured to:
determine, based at least in part on a disparity vector of the current PU, a reference PU for the current PU, wherein the reference PU is in a reference picture that is in the same access unit as the current picture and is in a different view than the current picture, wherein a first reference index for the reference PU indicates a position, within a first reference picture list for the reference PU, of a first target reference picture for the reference PU, and wherein the first reference picture list for the reference PU has a reference picture list index equal to 1;
determining an inter-view prediction motion vector candidate (IPMVC),
wherein, based on a determination that the first target reference picture for the reference PU is available and a Picture Order Count (POC) value of the first target reference picture for the reference PU matches a POC value of a target reference picture for the current PU, the IPMVC is determined based on a first motion vector of the reference PU,
wherein the first motion vector of the reference PU indicates a spatial displacement between a prediction block of the reference PU and a position within the first target reference picture for the reference PU,
wherein a reference index signaled for the current PU indicates a position, within a reference picture list of the current PU, of the target reference picture for the current PU, and
wherein a reference picture list index for the reference picture list of the current PU is equal to 1;
wherein based on a determination that the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, the IPMVC is determined based on a second motion vector of the reference PU,
wherein a second reference index of the reference PU indicates a position, within a second reference picture list for the reference PU, of the second target reference picture for the reference PU, the second reference picture list for the reference PU having a reference picture list index equal to 0,
wherein the second motion vector of the reference PU indicates a spatial displacement between the prediction block of the reference PU and a position within the second target reference picture for the reference PU.

22. The video coding device of claim 21, wherein:
the first target reference picture for the reference PU is available when the first reference index for the reference PU is greater than or equal to 0, and
the second target reference picture for the reference PU is available when the second reference index for the reference PU is greater than or equal to 0.

23. The video coding device of claim 21, wherein the one or more processors are configured to:
based on a determination that the first target reference picture for the reference PU is available, and the first target reference picture for the reference PU and the target reference picture for the current PU both belong to a picture type, scale the first motion vector of the reference PU based on a first POC distance, wherein the IPMVC is equal to the scaled first motion vector of the reference PU; and
based on a determination that the second target reference picture for the reference PU is available, and the second target reference picture for the reference PU and the target reference picture for the current PU both belong to the picture type, scale the second motion vector of the reference PU based on a second POC distance, wherein the IPMVC is equal to the scaled second motion vector of the reference PU.

24. The video coding device of claim 23, wherein the one or more processors are configured to include a zero motion vector in a candidate list when the second target reference picture for the reference PU is not available.

25. The video coding device of claim 23, wherein the picture type is short-term pictures.

26. The video coding device of claim 21, wherein the one or more processors are configured to:
based on a determination that the first target reference picture for the reference PU is available, the first target reference picture for the reference PU does not have the same POC value as the target reference picture for the current PU, and both the first target reference picture for the reference PU and the target reference picture for the current PU belong to a picture type, scale the first motion vector for the reference PU based on a first POC distance, wherein the IPMVC specifies the scaled first motion vector for the reference PU;

based on a determination that the first target reference picture for the reference PU is not available, the first target reference picture for the reference PU does not have the same POC value as the target reference picture for the current PU, or the first target reference picture for the reference PU and the target reference picture for the current PU do not both belong to the picture type, and the second target reference picture for the reference PU is available, and the second target reference picture for the reference PU and the target reference picture for the current PU have the same POC value, set the IPMVC to the second motion vector of the reference PU;

based on a determination that the first target reference picture for the reference PU is not available, the first target reference picture for the reference PU does not have the same POC value as the target reference picture for the current PU, the first target reference picture for the reference PU and the target reference picture for the current PU do not both belong to the picture type, the second target reference picture for the reference PU is available, the second target reference picture for the reference PU and the target reference picture for the current PU do not have the same POC value, and the second target reference picture for the reference PU and the target reference picture for the current PU both belong to the picture type, scale the second motion vector for the reference PU based on a second POC distance, wherein the IPMVC indicates the scaled second motion vector for the reference PU.

27. The video coding device of claim 26, wherein the picture type is short-term pictures.

28. The video coding device of claim 26, wherein the one or more processors are configured to include, in a candidate list, a temporal motion vector predictor (TMVP) candidate only when the IPMVC is unavailable.

29. The video coding device of claim 21, wherein the one or more processors are configured to include the IPMVC in a candidate list only when a TMVP candidate is unavailable.

30. The video coding device of claim 21, wherein the one or more processors are configured to substitute, in a candidate list, the IPMVC for a spatial motion vector predictor candidate when the spatial motion vector predictor candidate is unavailable and the target reference picture for the current PU is a temporal reference picture.

31. The video coding device of claim 21, wherein the one or more processors are configured to:
include the IPMVC in a candidate list; and
reconstruct, based on a motion vector specified by a selected motion vector candidate in the candidate list and samples of the target reference picture for the current PU, a prediction block for the current PU.

32. The video coding device of claim 21, wherein the one or more processors are configured to include, in a bitstream, data indicating a reference index that indicates a position, within a reference picture list of the current PU, of the target reference picture for the current PU.

33. A video coding device configured to code video data according to an advanced motion vector prediction (AMVP) mode, the video coding device comprising:
means for determining, based at least in part on a disparity vector of a current prediction unit (PU) of a current picture, a reference PU for the current PU, wherein the reference PU is in a reference picture that is in the same access unit as the current picture and is in a different view than the current picture, wherein a first reference index for the reference PU indicates a position, within a first reference picture list for the reference PU, of a first target reference picture for the reference PU, and wherein the first reference picture list for the reference PU has a reference picture list index equal to 1; and
means for determining an inter-view prediction motion vector candidate (IPMVC),
wherein, based on a determination that the first target reference picture for the reference PU is available and a Picture Order Count (POC) value of the first target reference picture for the reference PU matches a POC value of a target reference picture for the current PU, the IPMVC is determined based on a first motion vector of the reference PU,
wherein the first motion vector of the reference PU indicates a spatial displacement between a prediction block of the reference PU and a position within the first target reference picture for the reference PU,
wherein a reference index signaled for the current PU indicates a position, within a reference picture list of the current PU, of the target reference picture for the current PU, and
wherein a reference picture list index for the reference picture list of the current PU is equal to 1;
wherein, based on a determination that the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, the IPMVC is determined based on a second motion vector of the reference PU,
wherein a second reference index of the reference PU indicates a position, within a second reference picture list for the reference PU, of the second target reference picture for the reference PU, the second reference picture list for the reference PU having a reference picture list index equal to 0,
wherein the second motion vector of the reference PU indicates a spatial displacement between the prediction block of the reference PU and a position within the second target reference picture for the reference PU.

34. The video coding device of claim 33, further comprising:
means for including the IPMVC in a candidate list; and
means for reconstructing, based on a motion vector specified by a selected motion vector candidate in the candidate list and samples of the target reference picture for the current PU, a prediction block for the current PU.

35. The video coding device of claim 33, further comprising means for including, in a bitstream, data indicating a reference index that indicates a position, within a reference picture list of the current PU, of the target reference picture for the current PU.

36. A non-transitory computer-readable data storage medium having instructions stored thereon that when executed configure a video coding device that codes video data according to an advanced motion vector prediction (AMVP) mode to:

determine, based at least in part on a disparity vector of a current prediction unit (PU) of a current picture, a reference PU for the current PU, wherein the reference PU is in a reference picture that is in the same access unit as the current picture and is in a different view than the current picture, wherein a first reference index for the reference PU indicates a position, within a first reference picture list for the reference PU, of a first target reference picture for the reference PU, and wherein the first reference picture list for the reference PU has a reference picture list index equal to 1; and determine an inter-view prediction motion vector candidate (IPMVC), wherein, based on a determination that the first target reference picture for the reference PU is available and a Picture Order Count (POC) value of the first target reference picture for the reference PU matches a POC value of a target reference picture for the current PU, the IPMVC is determined based on a first motion vector of the reference PU, wherein the first motion vector of the reference PU indicates a spatial displacement between a prediction block of the reference PU and a position within the first target reference picture for the reference PU, wherein a reference index signaled for the current PU indicates a position, within a reference picture list of the current PU, of the target reference picture for the current PU, and wherein a reference picture list index for the reference picture list of the current PU is equal to 1;

wherein, based on a determination that the first target reference picture for the reference PU is not available or the first target reference picture for the reference PU does not have a POC value that matches the POC value of the target reference picture for the current PU, a second target reference picture for the reference PU is available, and a POC value of the second target reference picture for the reference PU matches the POC value of the target reference picture for the current PU, the IPMVC is determined based on a second motion vector of the reference PU, wherein a second reference index of the reference PU indicates a position, within a second reference picture list for the reference PU, of the second target reference picture for the reference PU, the second reference picture list for the reference PU having a reference picture list index equal to 0, wherein the second motion vector of the reference PU indicates a spatial displacement between the prediction block of the reference PU and a position within the second target reference picture for the reference PU.

37. The computer-readable data storage medium of claim 36, wherein the instructions, when executed, further configure the video coding device to:

include the IPMVC in a candidate list; and reconstruct, based on a motion vector specified by a selected motion vector candidate in the candidate list and samples of the target reference picture for the current PU, a prediction block for the current PU.

38. The computer-readable data storage medium of claim 36, wherein the instructions, when executed, further configure the video coding device to include, in a bitstream, data indicating a reference index that indicates a position, within a reference picture list of the current PU, of the target reference picture for the current PU.

\* \* \* \* \*